(12) United States Patent
Sengoku

(10) Patent No.: US 9,853,806 B2
(45) Date of Patent: Dec. 26, 2017

(54) METHOD TO ENHANCE MIPI D-PHY LINK RATE WITH MINIMAL PHY CHANGES AND NO PROTOCOL CHANGES

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/262,280

(22) Filed: Sep. 12, 2016

(65) Prior Publication Data
US 2016/0380755 A1    Dec. 29, 2016

Related U.S. Application Data

(63) Continuation of application No. 14/491,884, filed on Sep. 19, 2014.
(Continued)

(51) Int. Cl.
H04L 7/00    (2006.01)
H04L 7/04    (2006.01)
(Continued)

(52) U.S. Cl.
CPC .......... *H04L 7/0087* (2013.01); *H04L 7/0008* (2013.01); *H04L 7/033* (2013.01);
(Continued)

(58) Field of Classification Search
CPC .............................. H04L 7/033; H04L 7/0331
See application file for complete search history.

(56) References Cited

U.S. PATENT DOCUMENTS 4,280,221 A    7/1981 Chun et al.
4,644,547 A    2/1987 Vercellotti et al.
(Continued)

FOREIGN PATENT DOCUMENTS

CN    1663119 A    8/2005
CN    101083475 A    12/2007
(Continued)

OTHER PUBLICATIONS

International Search Report and Written Opinion—PCT/US2016/051131—ISA/EPO—dated Dec. 9, 2016.
(Continued)

*Primary Examiner* — Leon-Viet Nguyen
(74) *Attorney, Agent, or Firm* — Loza & Loza LLP

(57) ABSTRACT

System, methods and apparatus are described that facilitate transmission of data, particularly between two devices within an electronic apparatus. A first transition may be detected in a signal carried on a data lane of a data communications link or carried on a timing lane of the data communications link and an edge may be generated on a receiver clock signal based on the first transition. Data may be captured from the data lane using the receiver clock signal. The timing lane may carry a clock signal, a strobe signal or another signal providing timing information. The strobe signal may transition between signaling states when no state transition occurs on any of a plurality of data lanes at a boundary between consecutive data periods.

26 Claims, 14 Drawing Sheets

Related U.S. Application Data

(60) Provisional application No. 61/886,556, filed on Oct. 3, 2013.

(51) Int. Cl.
*H04L 7/033* (2006.01)
*H04L 25/14* (2006.01)
*H04L 7/027* (2006.01)

(52) U.S. Cl.
CPC ............... *H04L 7/04* (2013.01); *H04L 25/14* (2013.01); *H04L 7/0276* (2013.01)

(56) References Cited

U.S. PATENT DOCUMENTS

| | | | |
|---|---|---|---|
| 4,839,907 A | 6/1989 | Saneski | |
| 5,493,538 A | 2/1996 | Bergman | |
| 5,703,914 A | 12/1997 | Nakamura | |
| 5,748,043 A | 5/1998 | Koslov | |
| 5,835,498 A | 11/1998 | Kim et al. | |
| 5,859,669 A | 1/1999 | Prentice | |
| 5,862,180 A | 1/1999 | Heinz | |
| 5,959,568 A | 9/1999 | Woolley | |
| 6,028,639 A | 2/2000 | Bhatt et al. | |
| 6,320,406 B1 | 11/2001 | Morgan et al. | |
| 6,320,437 B1 | 11/2001 | Ma | |
| 6,477,205 B1 | 11/2002 | Doblar et al. | |
| 6,526,112 B1 | 2/2003 | Lai | |
| 6,556,628 B1 | 4/2003 | Poulton et al. | |
| 6,564,269 B1 | 5/2003 | Martin | |
| 6,624,766 B1 | 9/2003 | Possley et al. | |
| 6,728,908 B1 | 4/2004 | Fukuhara et al. | |
| 6,763,477 B1 | 7/2004 | McGee | |
| 6,799,239 B2 | 9/2004 | Vankrevelen | |
| 6,836,522 B1 | 12/2004 | Wakayama | |
| 6,845,131 B1 | 1/2005 | Ward et al. | |
| 6,874,097 B1 | 3/2005 | Aliahmad et al. | |
| 6,933,866 B1 * | 8/2005 | Weitz | H03M 5/12 341/50 |
| 7,061,939 B1 | 6/2006 | Chengson et al. | |
| 7,072,355 B2 | 7/2006 | Kizer | |
| 7,076,377 B2 | 7/2006 | Kim et al. | |
| 7,158,593 B2 | 1/2007 | Kim et al. | |
| 7,167,527 B1 | 1/2007 | Park et al. | |
| 7,190,754 B1 | 3/2007 | Chang et al. | |
| 7,313,208 B2 | 12/2007 | Frahm et al. | |
| 7,339,502 B2 | 3/2008 | Furtner | |
| 7,358,869 B1 | 4/2008 | Chiarulli et al. | |
| 7,395,347 B2 | 7/2008 | Nemawarkar et al. | |
| 7,463,680 B2 | 12/2008 | Buckwalter et al. | |
| 7,502,953 B2 | 3/2009 | Boecker et al. | |
| 7,515,668 B1 * | 4/2009 | Rokhsaz | H04L 7/033 375/340 |
| 7,667,500 B1 | 2/2010 | Alfke | |
| 7,715,509 B2 | 5/2010 | Stojanovic et al. | |
| 7,741,876 B2 | 6/2010 | Fusayasu et al. | |
| 7,781,677 B2 | 8/2010 | Matsubara et al. | |
| 7,791,370 B1 | 9/2010 | Hoang et al. | |
| 7,821,428 B2 | 10/2010 | Leung et al. | |
| 7,844,762 B2 | 11/2010 | Banks et al. | |
| 7,983,347 B2 | 7/2011 | Hamada et al. | |
| 7,986,732 B2 | 7/2011 | Koyama | |
| 8,000,412 B1 | 8/2011 | Loinaz | |
| 8,005,130 B2 | 8/2011 | Toyoda et al. | |
| 8,041,845 B2 | 10/2011 | Yang et al. | |
| 8,159,376 B2 | 4/2012 | Abbasfar | |
| 8,184,651 B2 | 5/2012 | Chan et al. | |
| 8,184,760 B2 | 5/2012 | Chien et al. | |
| 8,230,118 B2 | 7/2012 | Toba et al. | |
| 8,264,253 B2 | 9/2012 | Tian et al. | |
| 8,284,848 B2 | 10/2012 | Nam et al. | |
| 8,446,903 B1 | 5/2013 | Ranganathan et al. | |
| 8,599,913 B1 | 12/2013 | Brown et al. | |
| 8,606,184 B1 | 12/2013 | Luthra | |
| 8,621,128 B2 | 12/2013 | Radulescu et al. | |
| 8,649,460 B2 | 2/2014 | Ware et al. | |
| 8,659,957 B2 | 2/2014 | Sekine | |
| 8,660,213 B1 * | 2/2014 | Huynh | H04B 1/0014 375/322 |
| 8,686,754 B2 | 4/2014 | Chopra et al. | |
| 8,687,752 B2 | 4/2014 | Park et al. | |
| 8,798,189 B2 | 8/2014 | Kirkpatrick | |
| 8,848,810 B2 | 9/2014 | Lee et al. | |
| 8,861,553 B2 | 10/2014 | Chen et al. | |
| 8,959,268 B2 | 2/2015 | Hiraoka et al. | |
| 9,030,976 B2 | 5/2015 | Lee et al. | |
| 9,071,220 B2 | 6/2015 | Sengoku et al. | |
| 9,178,690 B2 | 11/2015 | Sengoku | |
| 9,179,117 B2 | 11/2015 | Hoshino et al. | |
| 9,203,599 B2 | 12/2015 | Sengoku | |
| 9,219,560 B2 | 12/2015 | Hummel | |
| 9,235,540 B1 | 1/2016 | Langhammer et al. | |
| 9,244,872 B2 | 1/2016 | Barbiero et al. | |
| 9,313,058 B2 | 4/2016 | Sengoku et al. | |
| 9,319,143 B2 | 4/2016 | El-Ahmadi et al. | |
| 9,337,997 B2 | 5/2016 | Sengoku et al. | |
| 9,363,071 B2 | 6/2016 | Sengoku et al. | |
| 9,374,216 B2 | 6/2016 | Sengoku et al. | |
| 2002/0005841 A1 | 1/2002 | Jung et al. | |
| 2003/0099135 A1 | 5/2003 | Stubbs | |
| 2004/0028164 A1 | 2/2004 | Jiang et al. | |
| 2004/0203559 A1 | 10/2004 | Stojanovic et al. | |
| 2005/0053171 A1 | 3/2005 | Pickering et al. | |
| 2005/0069071 A1 | 3/2005 | Kim et al. | |
| 2005/0104649 A1 | 5/2005 | Yonezawa | |
| 2005/0140415 A1 | 6/2005 | Hazucha et al. | |
| 2005/0207280 A1 | 9/2005 | Fowler et al. | |
| 2005/0218953 A1 | 10/2005 | Slawecki | |
| 2005/0219083 A1 | 10/2005 | Boomer et al. | |
| 2006/0006902 A1 | 1/2006 | Sagiv | |
| 2006/0061494 A1 | 3/2006 | Hosaka et al. | |
| 2006/0098596 A1 | 5/2006 | Park et al. | |
| 2006/0123177 A1 | 6/2006 | Chan et al. | |
| 2006/0132335 A1 | 6/2006 | Kojima | |
| 2006/0140321 A1 * | 6/2006 | Tell | H03L 7/0814 375/376 |
| 2006/0168615 A1 | 7/2006 | Igler et al. | |
| 2007/0073932 A1 | 3/2007 | Pike et al. | |
| 2007/0153916 A1 | 7/2007 | Demircin et al. | |
| 2007/0188187 A1 | 8/2007 | Oliva et al. | |
| 2007/0241836 A1 | 10/2007 | Miller | |
| 2008/0063127 A1 | 3/2008 | Hayashi et al. | |
| 2008/0159432 A1 | 7/2008 | Ng | |
| 2008/0165732 A1 | 7/2008 | Kim et al. | |
| 2008/0212709 A1 | 9/2008 | Wiley et al. | |
| 2009/0037006 A1 | 2/2009 | Hiratsuka et al. | |
| 2009/0080584 A1 * | 3/2009 | Hamano | H03L 7/087 375/371 |
| 2009/0195699 A1 | 8/2009 | Hamada et al. | |
| 2009/0243681 A1 | 10/2009 | Zerbe et al. | |
| 2010/0001758 A1 | 1/2010 | Dreps et al. | |
| 2010/0002819 A1 | 1/2010 | Conner | |
| 2010/0027607 A1 | 2/2010 | Kwasniewski et al. | |
| 2010/0040169 A1 | 2/2010 | Abbasfar | |
| 2010/0111207 A1 | 5/2010 | Suda et al. | |
| 2010/0142723 A1 | 6/2010 | Bucklen | |
| 2010/0180143 A1 | 7/2010 | Ware et al. | |
| 2010/0183053 A1 | 7/2010 | Tran et al. | |
| 2010/0215118 A1 | 8/2010 | Ware et al. | |
| 2010/0264967 A1 * | 10/2010 | Lee, Jr. | H03L 7/087 327/158 |
| 2011/0013707 A1 | 1/2011 | Walker et al. | |
| 2011/0066778 A1 | 3/2011 | Chan et al. | |
| 2011/0176646 A1 | 7/2011 | Pal et al. | |
| 2011/0197086 A1 | 8/2011 | Rivoir | |
| 2011/0206355 A1 | 8/2011 | Toba et al. | |
| 2011/0216863 A1 | 9/2011 | Tomita et al. | |
| 2011/0249781 A1 | 10/2011 | Guillot et al. | |
| 2012/0020660 A1 | 1/2012 | Le Taillandier De Gabory et al. | |
| 2012/0027203 A1 | 2/2012 | Inada | |
| 2012/0213299 A1 | 8/2012 | Cronie et al. | |
| 2012/0223754 A1 | 9/2012 | Lewis | |
| 2012/0224656 A1 | 9/2012 | Aoki | |
| 2012/0307886 A1 | 12/2012 | Agarwal et al. | |

(56) References Cited

U.S. PATENT DOCUMENTS

| | | |
|---|---|---|
| 2012/0326783 A1 | 12/2012 | Mathe et al. |
| 2013/0127645 A1 | 5/2013 | Shibata |
| 2013/0225067 A1 | 8/2013 | Card et al. |
| 2013/0241759 A1 | 9/2013 | Wiley et al. |
| 2013/0279551 A1 | 10/2013 | Fujimori et al. |
| 2013/0294490 A1 | 11/2013 | Chandrasekaran et al. |
| 2014/0003543 A1 | 1/2014 | Wiley et al. |
| 2014/0009633 A1* | 1/2014 | Chopra ............... H04L 7/0012 348/222.1 |
| 2014/0065986 A1 | 3/2014 | McCallister |
| 2014/0082397 A1 | 3/2014 | Shin et al. |
| 2014/0168010 A1 | 6/2014 | Mohamadi |
| 2014/0270026 A1 | 9/2014 | Sengoku et al. |
| 2014/0286389 A1 | 9/2014 | Zerbe et al. |
| 2015/0043358 A1 | 2/2015 | Wiley et al. |
| 2015/0098537 A1 | 4/2015 | Sengoku |
| 2015/0098538 A1 | 4/2015 | Wiley et al. |
| 2015/0145600 A1 | 5/2015 | Hur et al. |
| 2015/0220472 A1 | 8/2015 | Sengoku |
| 2016/0028534 A1 | 1/2016 | Sengoku |
| 2016/0065357 A1 | 3/2016 | Sengoku |
| 2016/0127121 A1 | 5/2016 | Sengoku et al. |
| 2016/0261400 A1 | 9/2016 | Sengoku et al. |

FOREIGN PATENT DOCUMENTS

| | | |
|---|---|---|
| CN | 103404027 A | 11/2013 |
| DE | 3329773 A1 | 2/1985 |
| DE | 102004013093 B3 | 7/2005 |
| EP | 1385306 A1 | 1/2004 |
| GB | 2456517 A | 7/2009 |
| JP | 2003258844 A | 9/2003 |
| JP | 2005210695 A | 8/2005 |
| JP | 2006505945 A | 2/2006 |
| JP | 2006093988 A | 4/2006 |
| JP | 2008242884 A | 10/2008 |
| JP | 2011029779 A | 2/2011 |
| KR | 20020054053 A | 7/2002 |
| KR | 20100063485 A | 6/2010 |
| KR | 20140119781 A | 10/2014 |
| KR | 1020150124409 A | 11/2015 |
| WO | WO-2007009038 A2 | 1/2007 |
| WO | WO-2008109478 A2 | 9/2008 |
| WO | WO-2008151251 A1 | 12/2008 |
| WO | WO-2009086078 A1 | 7/2009 |
| WO | WO-2009111175 A1 | 9/2009 |
| WO | WO-2009111208 | 9/2009 |
| WO | WO-2013138478 A1 | 9/2013 |
| WO | WO-2014138644 | 9/2014 |
| WO | WO-2015050736 A1 | 4/2015 |

OTHER PUBLICATIONS

Bell A G., et al., "WAM 7.1: A Single Chip NMOS Ethernet Controller", IEEE: International Solid-State Circuits Conference, XX, XX, Feb. 23, 1983 (Feb. 23, 1983), XP001 039599, pp. 13-78.

"Draft MIPI Alliance Specification for Camera Serial Interface 2 (CSI-2)" In:"Draft MIPI Alliance Specification for Camera Serial Interface 2 (CSI-2)", Apr. 2, 2009 {Apr. 2, 2009), XP055165978, 6. Camera Control Interface (CCI) 529-728.

International Search Report and Written Opinion—PCT/US2014/056838—ISA/EPO—dated Dec. 9, 2014.

"MIPI Alliance Specification for D-PHY," Sep. 22, 2009 (Sep. 22, 2009), pp. 1-125, XP055057664 [Retrieved on Mar. 25, 2013].

Muller P., et al., "Top-Down Design of a Low-Power Multi-Channel 2.5-Gbit/s/Channel Gated Oscillator Clock-Recovery Circuit", Design, Automation and Test in Europe, 2005. Proceedings Munich, Germany Mar. 7-11, 2005, Piscataway, NJ, USA, IEEE, Mar. 7, 2005 (Mar. 7, 2005), pp. 258-263, XP010779962, ISBN: 978-0-7695-2288-3.

Poulton J W., et al., "Multiwire Differential Signaling", Aug. 6, 2003 No. 1.1 Aug. 6, 2003 {Aug. 6, 2003), pp. 1-20, XP002610849, Retrieved from the Internet: URL:http://www.cs.unc.eduf-jpfmwire.pdf [retrieved on Nov. 23, 2010] the whole document.

Vitesse, "VSC7226 Quad 3.125Gb/s Backplane Transceiver," VITESSE Semiconductor Corporation, PB-VSC7226-002, 2002, 2 Pages.

Williams A., "Synopsys describes MIPI DigRF protocol for 4G mobile," Retrieved from the Internet <URL: http://www.electronicsweekly.com/news/design/eda-and-ip/synopsys-describes- mipi-digrf-protocol-for-4g-mobile-2012-03/ >, 2012, 6 Pages.

Zhu C., et al., "Multi-Machine Communication Based on I2C-Bus," Sensors & Transducers, Jul. 2014, vol. 174 (7), pp. 138-143.

Zogopoulos S., et al., "High-Speed Single-Ended Parallel Link Based on Three-Level Differential Encoding", IEEE Journal of Solid-State Circuits, IEEE Service Center, Piscataway, NJ, USA, vol. 44, No. 2, Feb. 1, 2009 {Feb. 1, 2009), pp. 549-557, XP011243176, ISSN: 0018-9200, DOI: 10.1109/JSSC.2008.2011038 the whole document.

European Search Report—EPI 7167127—Search Authority—The Hague—dated Jul. 20, 2017.

\* cited by examiner

METHOD TO ENHANCE MIPI D-PHY LINK RATE WITH MINIMAL PHY CHANGES AND NO PROTOCOL CHANGES

CROSS-REFERENCE TO RELATED APPLICATIONS

This application is a continuation of U.S. patent application Ser. No. 14/491,884 filed on Sep. 19, 2014, which claimed priority to and the benefit of U.S. provisional patent application No. 61/886,556 filed on Oct. 3, 2013, the entire content of these applications being incorporated herein by reference.

TECHNICAL FIELD

The present disclosure relates generally to high-speed data communications interfaces, and more particularly, clock and data recovery in multi-lane differential data communication links.

BACKGROUND

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and the display and/or other devices may be interconnected using a standards-based or proprietary physical interface, which may include a plurality of data and clock lanes. Demand for improved data rates continues to increase and it can be desirable to increase clock frequencies used to transmit and receive data over the communications link. However, signal transition times and the transmission of the clock signal can limit the maximum data rates for the communications link.

Therefore, improved clock generation and data sampling and capture techniques are required to enable higher data transfer rates on multi-signal communications links.

SUMMARY

Embodiments disclosed herein provide systems, methods and apparatus for extracting data and clocks from signals transmitted on a multi-lane data communications link. Certain aspects of the disclosure relate to clock management in high-speed data communications links.

In an aspect of the disclosure, a method of data communications includes detecting a first transition in a signal carried on a data lane of a data communications link or carried on a timing lane of the data communications link, generating an edge on a receiver clock signal based on the first transition, and capturing data received from the data lane using the receiver clock signal. The transition may occur at a boundary between a first data period and a second data period. The timing lane may carry a clock signal, a strobe signal or another signal providing timing information.

In one aspect, the timing lane carries a double data rate clock signal. Transitions of the double data rate clock signal may be aligned with transitions of the data received from the data lane.

In one aspect, the timing lane may carry a strobe signal that transitions between signaling states when no transition occurs in signaling state of the data lane between the first data period and the second data period. The strobe signal may transition between signaling states when no state transition occurs in the signaling state of a plurality of data lanes between the first data period and the second data period.

In one aspect, a first symbol representative of the signaling state of a plurality of lanes that includes the timing lane and the data lane during the first data period is compared with a second symbol representative of the signaling state of the plurality of lanes during the second data period.

In one aspect, data received from one or more data lanes may be deserialized using the receiver clock signal. The receiver clock signal may be unaffected by one or more additional transitions occurring in relation to the boundary between the first data period and the second data period when the one or more additional transitions occur after the edge has been generated. For example, the additional transitions may be ignored such that a single edge is provided on the receiver clock signal at each boundary between data periods.

In one aspect, the first data period occurs before the second data period. The edge may be used to capture a delayed version of data transmitted in the first data period.

In one aspect, the first transition is detected by monitoring a plurality of data lanes and the timing lane. The first transition may be a first-occurring transition in a signal transmitted on the plurality of data lanes or on the timing lane.

In an aspect of the disclosure, an apparatus includes means for detecting a first transition in one of a data lane of a data communications link and a timing lane of the data communications link, means for generating an edge of a receiver clock signal based on the first transition, and means for decoding data received from the data lane using the receiver clock signal. The transition may occur at a boundary between a first data period and a second data period.

In an aspect of the disclosure, an apparatus includes a processing circuit configured to detect a first transition in one of a data lane of a data communications link and a timing lane of the data communications link, generate an edge on a receiver clock signal based on the first transition, and capture data received from the data lane using the receiver clock signal. The transition may occur at a boundary between a first data period and a second data period.

In an aspect of the disclosure, a processor-readable storage medium maintains or stores one or more instructions that may be executed by at least one processing circuit. The instructions may cause the at least one processing circuit to detect a first transition in one of a data lane of a data communications link and a timing lane of the data communications link, generate an edge on a receiver clock signal based on the first transition, and capture data received from the data lane using the receiver clock signal. The transition may occur at a boundary between a first data period and a second data period.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
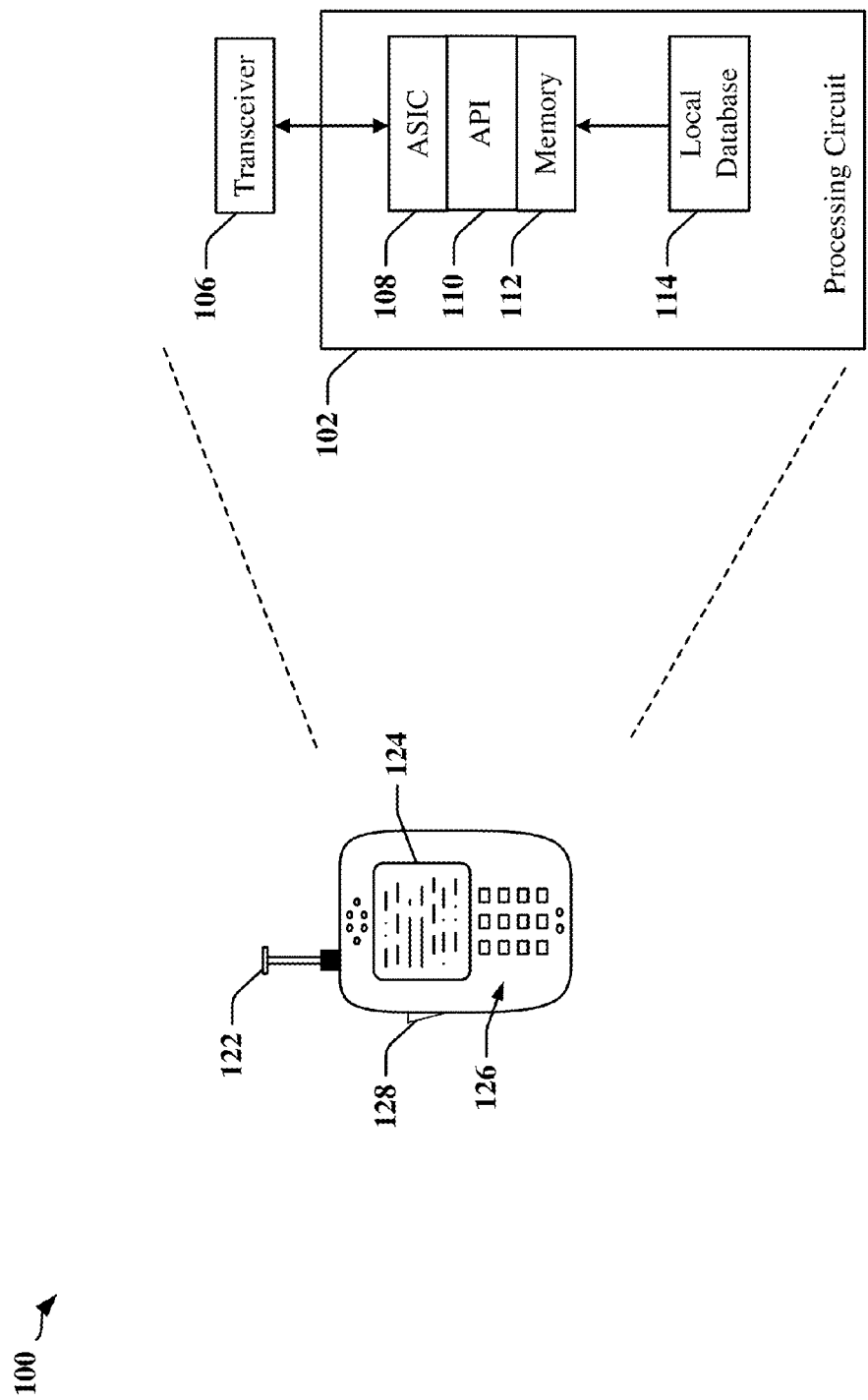
FIG. 1 depicts an apparatus employing a data link between IC devices that selectively operates according to one of plurality of available standards.

Certain aspects of the invention may be applicable to communications links deployed between electronic components, including subcomponents of a device such as a telephone, a mobile computing device, an appliance, a device embedded or deployed within an automobile, and avionics system, etc. FIG. 1 depicts an example of an apparatus 100 employing a data link between IC devices, where the data link may selectively operate according to one of plurality of available standards. The apparatus 100 may include a wireless communication device that communicates wirelessly with a radio access network (RAN), a core access network, the Internet and/or another network. The apparatus 100 may include a communications transceiver 106 operably coupled to a processing circuit 102. The processing circuit 102 may include one or more IC devices, such as an application-specific IC (ASIC) 108. The ASIC 108 may include one or more processing devices, sequencers, state machines, logic circuits, and so on. The processing circuit 102 may include and/or be coupled to processor readable storage such as a memory device 112 that may maintain instructions and data the may be executed by processing circuit 102. The processing circuit 102 may be controlled by one or more of an operating system and an application programming interface (API) 110 layer that supports and enables execution of software modules residing in the memory device 112. The memory device 112 may include read-only memory (ROM) and/or random-access memory (RAM), electrically-erasable programmable read only memory (EEPROM), a flash memory device, or any memory device that can be used in processing systems and computing platforms. The processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
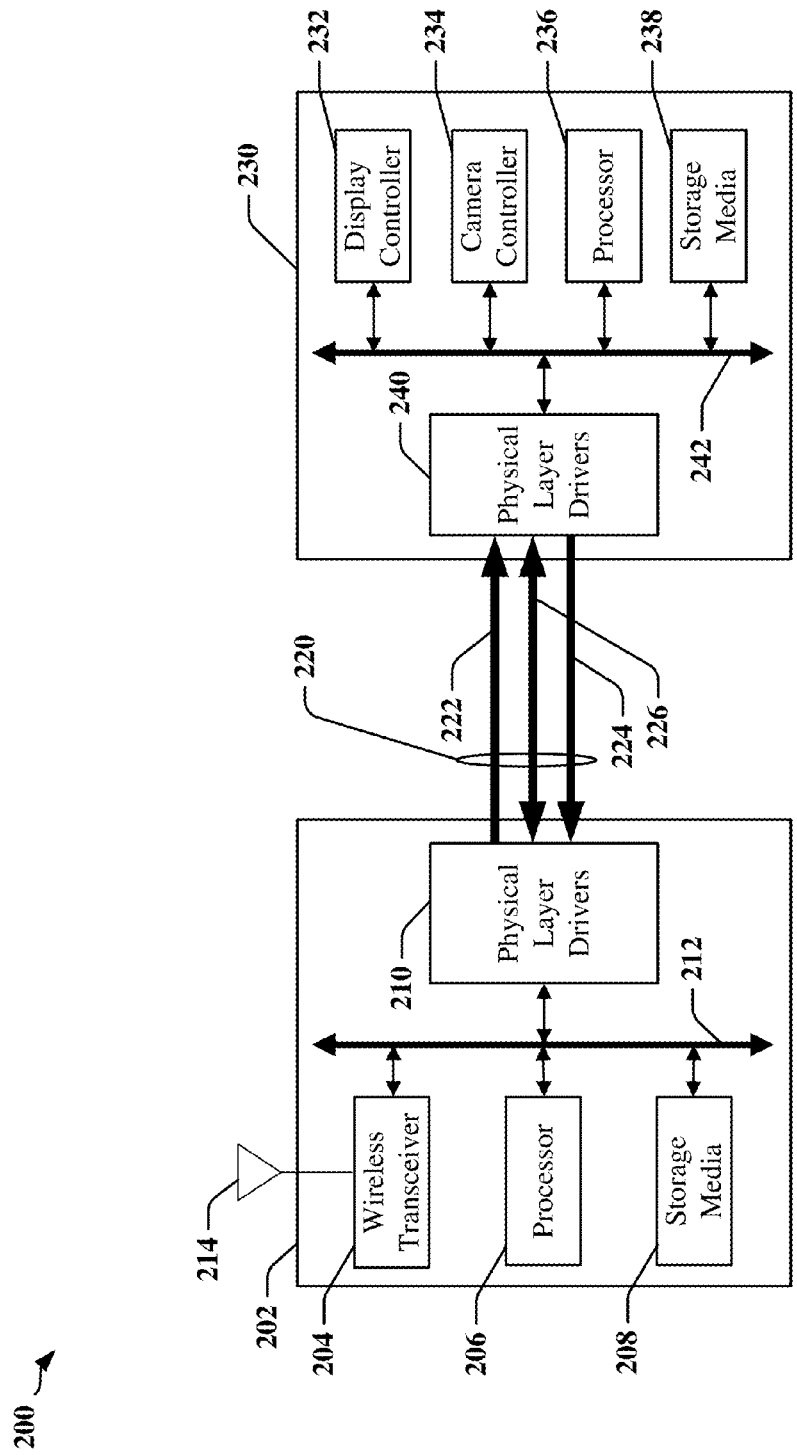
FIG. 2 illustrates a system architecture for an apparatus employing a data link between IC devices that may be adapted according to certain aspects disclosed herein.

FIG. 2 is a block schematic diagram illustrating certain aspects of an apparatus 200 such as a wireless mobile device, a mobile telephone, a mobile computing system, a wireless telephone, a notebook computer, a tablet computing device, a media player, a wearable computing device, a gaming device, or the like. The apparatus 200 may include a plurality of IC devices 202 and 230 that exchange data and control information through a communications link 220. The communications link 220 may be used to interconnect the IC devices 202 and 222, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communications link 220 may include a cable or optical connection.

The communications link 220 may include multiple channels 222, 224 and 226. One or more channel 226 may be bidirectional, and may operate in half-duplex and/or fullduplex modes. One or more channel 222 and 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface, manage or operate a display controller 232, and/or control operations of a camera or video input device using a camera controller 234. Other features supported by one or more of the IC devices 202 and 230 may include a keyboard, a voice-recognition component, and other input or output devices. The display controller 232 may include circuits and software drivers that support a display such as a liquid crystal display (LCD) panel, a touch-screen display, an indicator and so on. The storage media 208 and 238 may include transitory and/or non-transitory storage devices adapted to maintain instructions and data used by the respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and the reverse link 224 may be capable of transmitting at comparable speeds or at different speeds, where speed may be expressed as data transfer rate and/or clocking rates. The forward and reverse data rates may be substantially the same or may differ by orders of magnitude, depending on the application. In some applications a bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

The communications link 220 of FIG. 2 may be implemented as a wired bus that includes a plurality of signal lanes, which may be configured to carry encoded data in a high-speed digital interface. The physical layer drivers 210 and 240 may be configured or adapted to generate encoded data for transmission on the communications link 220. Encoding schemes may be selected according to industry standards and to provide high speed data transfer and minimized power consumption.

In one example, forward and reverse links 222 and 224 may be configured or adapted to support a wide video graphics array (WVGA) 80 frames per second LCD driver IC without a frame buffer, delivering pixel data at 810 Mbps for display refresh.

In another example, forward and reverse links 222 and 224 may be configured or adapted to enable communications between with dynamic random access memory (DRAM), such as double data rate (DDR) synchronous dynamic random access memory (SDRAM). Encoding devices may be configured or adapted to encode multiple bits of data per clock transition, and multiple sets of wires can be used to transmit and receive data from the SDRAM, including control signals, address signals, and so on. The encoding devices may be provided in the physical layer drivers 210 and/or 240, or in other components of the IC devices 202 and 230.

The forward and reverse links 222 and 224 may comply or be compatible with application-specific industry standards. In one example, the Mobile Industry Processor Interface Alliance (MIPI) standard defines physical layer interfaces including a synchronous interface specification (D-PHY or M-PHY) between an application processor IC device 202 and an IC device 230 that supports the camera or display in a mobile communication device. The D-PHY specification governs the operational characteristics of products that comply with MIPI specifications for mobile devices. A D-PHY interface may support data transfers using a flexible, low-cost, high-speed serial interface that interconnects between components 202 and 230 within the mobile communication device. These interfaces may include complimentary metal-oxide-semiconductor (CMOS) parallel busses providing relatively low bit rates with slow edges to avoid electromagnetic interference (EMI) issues.

In one example, MIPI D-PHY may support high-speed differential signaling using a high-speed clock lane and one or more data lanes, where each lane is carried on a pair of differentially driven wires. The MIPI D-PHY maximum link rate may range from 1.0 gigabits per second (Gbps) per lane to 1.5 Gbps per lane. However, increased data rates may be needed for certain applications, including for camera applications that use a large pixel image sensor with high frame rate. Certain M-PHY next-generation interfaces specify higher link bandwidth in order to satisfy demands for increased data rates.

Certain aspects of this disclosure are applicable to communications links implemented to comply or be compatible with MIPI D-PHY standards and to communications links that extend the capabilities of these standards, including links developed to bridge the capabilities gap of D-PHY and M-PHY standards-defined data communications links in order to satisfy changing demands for bandwidth, throughput, etc. Maximum link data rates can be increased through improved clock management, for example.

Figure 3:
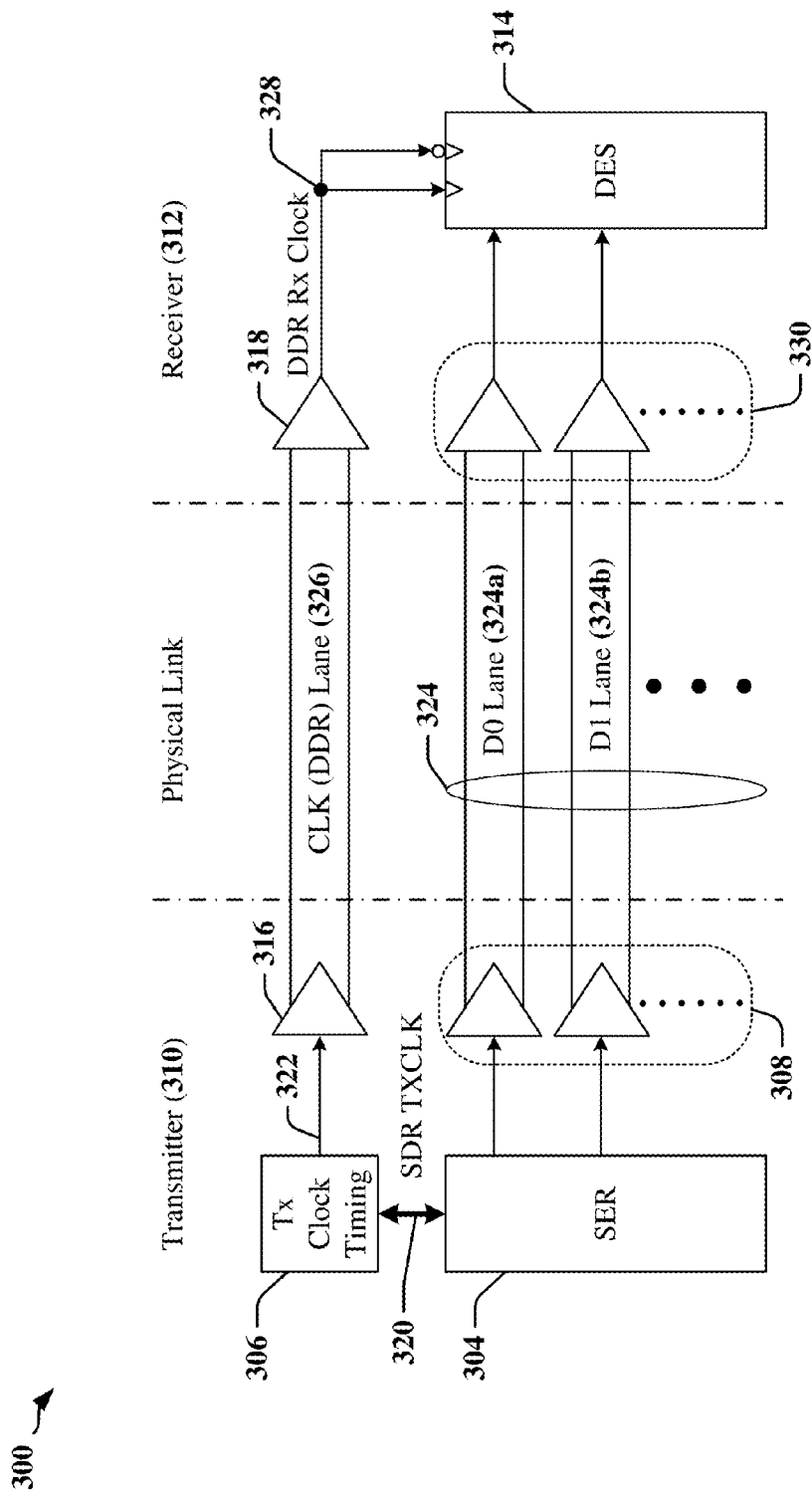
FIG. 3 illustrates a clock and data transmission scheme for a differentially-encoded communications link.
Figure 4:
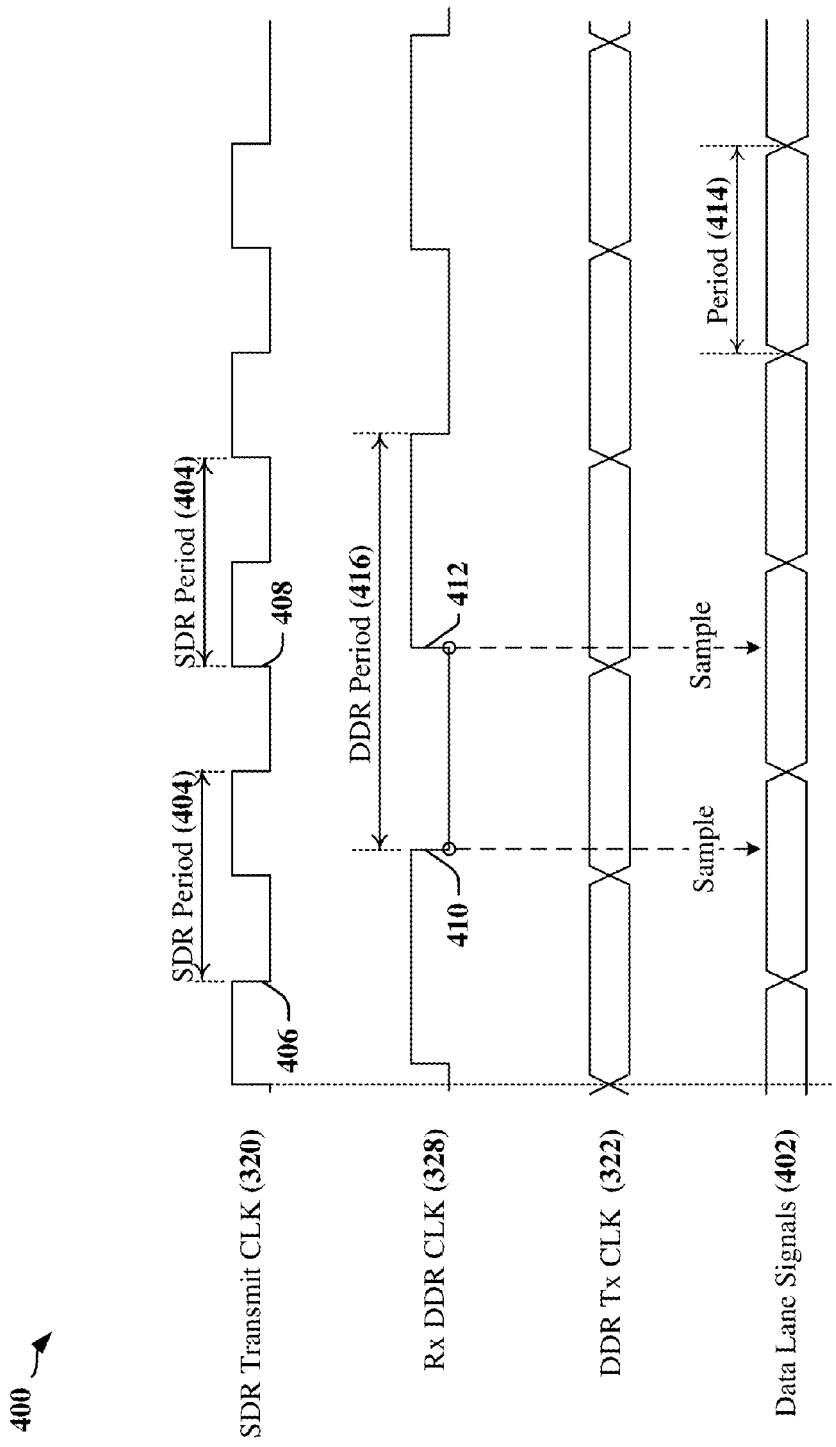
FIG. 4 illustrates signal timing for a data communications interface adapted according to certain aspects disclosed herein.

FIG. 3 is a diagram illustrating an example of a data communications interface 300 that may be operated according to MIPI D-PHY specifications and FIG. 4 illustrates certain aspects of signal timing for such data communications interface 300. In the example, a serializer (SER) 304 converts data words, bytes or other-sized data elements to a serial stream of data in signals provided to each of a plurality of differential line drivers 308 in a transmitting circuit 310. Each of the differential line drivers 308 is configured or adapted to transmit the data in differential signals over one or more data lanes 324. In the depicted example, at least two data lanes 324a and 324b are implemented in the data communications interface 300. At a receiving circuit 312, differential receivers 330 are configured or adapted to receive the differential signals from the data lanes 324, and to provide received serial data streams to a deserializer (DES) 314. The DES 314 may then convert the serial data streams to words, bytes or other-sized data elements.

The data lanes 324a and 324b may be operated to communicate data at a rate determined by the frequency of a transmit clock signal 320. The transmit clock signal 320 may be a single data rate (SDR) clock signal, whereby data is transmitted on either a falling edge 406 or a rising edge 408 of the transmit clock signal 320. The transmit clock signal 320 may be generated by a transmit (Tx) clock timing circuit 306, which may also generate a clock signal 322 for transmission on a clock lane 326. In one example, the clock signal 322 may be a dual data rate (DDR) clock having a period 416 that has twice the duration of the period 404 of the SDR transmit clock signal 320 used by the SER 304. The DDR Tx clock signal 322 may be derived from, and/or synchronized with the SDR transmit clock signal 320 used by the SER 304. At the receiving circuit 312, data may be sampled using both the falling edge 410 and the rising edge 412 of a DDR receive clock (Rx clock) signal 328 recovered from the clock lane 326. In some instances, the DDR Tx clock signal 322 may be phase shifted with respect to the SDR transmit clock signal 320 in order to provide sampling edges 410, 412 that occur when the signals on the data lanes 324 have stabilized. In one example, the phase shift may be 90 degrees. In another example, the phase shift may be 45 degrees. Other phase shifts may be used in other examples, and the phase shift selected for use may be determined by factors associated with the type of communications interface used, transmission rates, etc.

The use of a lower frequency DDR Tx clock 322 on the clock lane 326 may result in lower power consumption by data communications interface 300. Furthermore, data received from the data lanes 324 and/or the Rx clock signal 328 recovered from the clock lane 326 may be less susceptible to error, phase shift and/or jitter when a DDR Tx clock signal 322 is transmitted on the clock lane 326.

The receive (Rx) clock signal 328 recovered from the clock lane 326 may provide reference edges 410, 412 that can be used by the DES 314 of the receiving circuit 312 to capture data from the data lanes 324. As illustrated in FIG. 4, each falling edge 410 and rising edge 412 of the Rx clock signal 328 may be used for sampling the signals 402 received on the data lanes 324. A differential receiver 318 may be provided to receive the Rx clock signal 328 from the clock lane 326. In one example, the differential receiver 318 provides the Rx clock signal 328 directly to the DES 314. In another example, the Rx clock signal 328 may be delayed before it is provided to the DES 314. For example, the Rx clock signal 328 may be phase delayed to provide data sampling edges between transitions on the signals received from the data lanes 324. The DES 314 may use non-inverted and inverted versions of the Rx clock signal 328 in order to capture data at or after each transition of the Rx clock signal 328. The Rx clock signal 328 may be used to synchronize the DES 314 with the SER 304.

The maximum link rate may be limited by skew, jitter, and/or transition (rise or fall) times associated with the clock lane 326 and/or on the data lanes 324. In order to reliably capture data from the data lanes 324, the DDR Tx clock signal 322 and/or the Rx clock signal 328 may be phase shifted. In one example, the phase shift may cause edges 410, 412 in the Rx clock signal 328 to occur at, or near the middle of each data transmission period 414. In another example, the phase shift may cause edges 410, 412 in the Rx clock signal 328 to be delayed by a predefined time period that may correspond to a specified transition time period and/or a specified setup time after the edge 410, 412. In another example, the phase shift may cause edges 410, 412 in the Rx clock signal 328 to occur near the end of each data transmission period 414.

According to certain aspects disclosed herein, the DDR Tx clock signal 322 may be transmitted over a D-PHY physical link at half the frequency of the SDR clock signal 320 provided to the SER 304. In one example, the DDR Tx clock signal 322 may be a 500 MHz signal that supports a 1 Gbps data rata for the data lanes 324, when the SER 304 is clocked with a 1 GHz SDR transmit clock signal 320. In some instances, the SDR transmit clock signal 320 may be used by the SER 304 and/or the Tx clock timing circuit 306 to generate CLK edges between data signal transitions.

Figure 5:
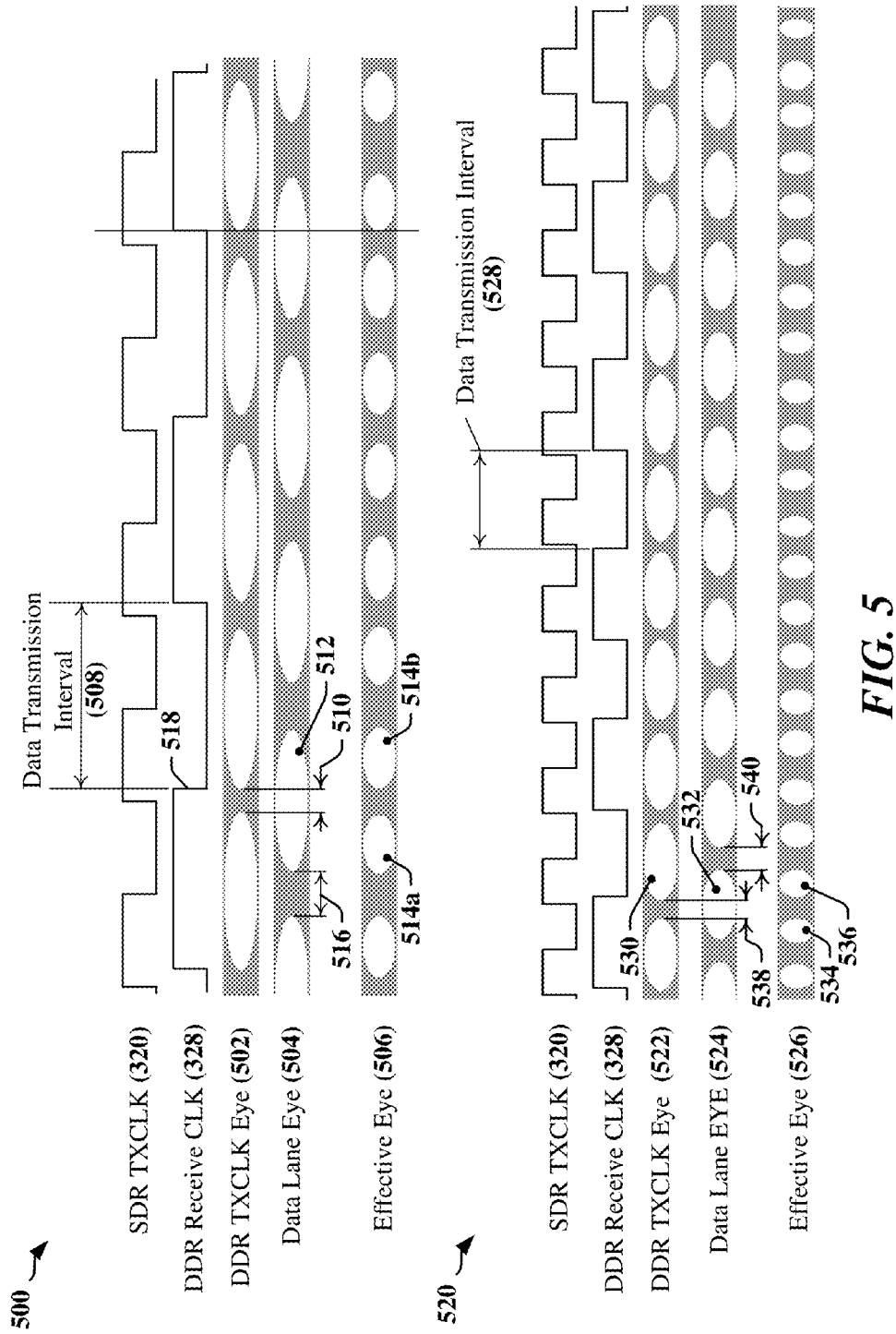
FIG. 5 illustrates certain aspects of the timing associated with data transmission on the data lanes of a data communications interface according to certain aspects disclosed herein.

FIG. 5 includes timing diagrams 500, 520 that illustrate certain aspects of the timing associated with data transmission on the data lanes 324 of the data communications interface 300 illustrated in FIG. 3. A first timing diagram 500 illustrates timing for data transmissions using a transmit clock rate that is approximately half the rate used for data transmission illustrated in a second timing diagram 520. The first and second timing diagrams 500, 520 illustrate certain effects associated with increased clocking frequency on the relationship between the SDR transmit clock signal 320, the Rx clock signal 328, and the data received from the data lanes 324. In the first example, a transmit clock eye pattern 502 includes a transition region 510 during which an edge of the DDR Tx clock signal 322 is expected to occur on the clock lane 326. The transition region 510 typically spans the time between the earliest possible occurrence of the edge and the latest possible occurrence of the edge. The transition region 510 may correspond to timing tolerances of circuitry associated with the communication of the DDR Tx clock signal 322, including the line driver 316, the receiver 318, and the DES 314 in at least some instances. The timing tolerances and/or the transition region 510 may relate to setup times, propagation delays, rise and/or fall times, and the like. The timing tolerances and/or the transition region 510 may accommodate variability of metal resistance-capacitance (RC) values, which are subject to process, voltage and temperature (PVT) variation, for example.

The transition region 510 corresponding to the DDR Tx clock signal 322 may determine a period of time when signals transmitted on the data lanes 324 are expected to be stable. In some instances, the signals transmitted on the data lanes 324 may be sampled based on a clock edge 518 of the DDR receive clock signal 328, which may be derived from a signal received from the clock lane 328. With reference to the first timing diagram 500 for example, the edge 518 of the DDR receive clock signal 328 may be provided at or near the end of the transition region 510 of the DDR Tx clock signal 322. In at least some instances, the edge 518 of the receive clock signal 328 may be phase-shifted, delayed or advanced with respect to the actual occurrence of the rising edge of the DDR Tx clock signal 322. In one example, some differences in timing between the edge 518 of the DDR receive clock signal 328 and an edge of the DDR Tx clock signal 322 may be attributable, at least in part, to variability of setup times, propagation delays, rise times, and the like. In another example, a difference in timing between the edge 518 of the DDR receive clock signal 328 and an edge of the DDR transmit clock signal 322 may be attributable, at least in part, to delay elements and other logic.

The data lane eye diagram 504 illustrates the transition region 516 associated with the data lanes 324, and a resultant period of stability (eye region) 512. The transition region 516 may correspond to timing tolerances associated with circuitry associated with transmission over the data lanes 324, including the line drivers 308, the receivers 330, the SER 304, Tx timing circuit circuit 306, the clock signal receiver 318, and the DES 314 including clock recovery circuitry, for example. In order to reliably receive data from the data lanes 324, the edge 518 of the receive clock signal 328 may be provided within the eye region 512 when the signaling state of the data lanes 324 is expected to be stable. In the data lane eye diagram 504, the eye region 512 represents the time period between successive transition regions 516 on the data lanes 324. The eye region 512 for a combination of the data lanes 324 may be shorter in duration than an eye region that is calculated or measured for an individual data lane 324a, 324b when, for example, a timing skew exists between the signals on the data lanes 324a, 324b.

According to certain aspects, data sampling is performed before or after the transition region 510 of the DDR transmit clock signal 322 to avoid the effects of transient signals. For example, the DDR receive clock signal 328 may provide sampling edges 518 that occur within the transition region 510 of the DDR transmit clock signal 322. In this example, data can be reliably captured from the data lanes 324 when the eye region 512 for the data lanes 324 is longer in duration than the transition region 510 of the DDR transmit clock signal 322. An effective data lane eye diagram 506 illustrates eye regions 514a and 514b during which data may be captured from the data lanes during the corresponding eye region 512 during which signals on the data lanes 324 are expected to be in a stable state. The proportion of the data transmission interval 508 occupied by the transition regions 510 and 516 is sufficiently small that a sampling window is available in which all possible transitions of the DDR transmit clock signal 322 occur within the data eye region 512.

The duration of the eye regions 514a and 514b may correspond to timing margins that can limit the design of clock recovery circuits. These timing margins can be significantly compressed when the frequency of the DDR transmit clock signal 322 is increased. The second timing diagram 520 illustrates an example where the frequency of the DDR transmit clock signal 322 is approximately doubled with respect to the example illustrated in the first timing diagram 500. In the second timing diagram 520, the eye regions 530 and 532 and transition regions 538 and 540 of the DDR transmit clock eye diagram 522 and the data lane eye diagram 524 have durations that are significantly shorter than corresponding eye regions 512 and transition regions 510, 516 in the first timing diagrams 500.

In the depicted example, the DDR transmit clock signal 322 may have a transition region 538 that has substantially the same duration as the transition region 510 in the first timing diagram 500. The signals transmitted on the data lanes 324 may have a combined transition region 540 that has substantially the same duration as the transition region 516 of the first timing diagram 500. The transition regions 510 and 516 occupy a greater portion of the data transmission interval 528, which is shorter in duration than the data transmission interval 508 of the first example. The effective eye pattern 526, which may be described as an overlay of the DDR transmit clock eye diagram 522 and the data lane eye diagram 524, has effective eyes 534, 536 that are relatively short in duration. Data sampling can fail when one effective eye 534 or 536 closes when clock transitions overlap or occur in close temporal proximity to data transitions. Phase shifts in a received DDR transmit clock signal 322 can decrease the reliability of data capture. For example, a phase shift of 45 degrees in a received DDR transmit clock signal 322 essentially cuts the duration of the effective eye 534, 536 in half and reduces the ability of the DES 314 to reliably capture data from the data lanes 324. Accordingly, higher transfer rates can increase the difficulty of reliably capturing data from the data lanes 324.

According to certain aspects disclosed herein, improved clocking of a high-speed data link may be obtained by extracting clock information from some combination of clock signal transmitted on the clock lane 326, data signals transmitted on the data lanes 324, and/or other clock related signals.

Figure 6:
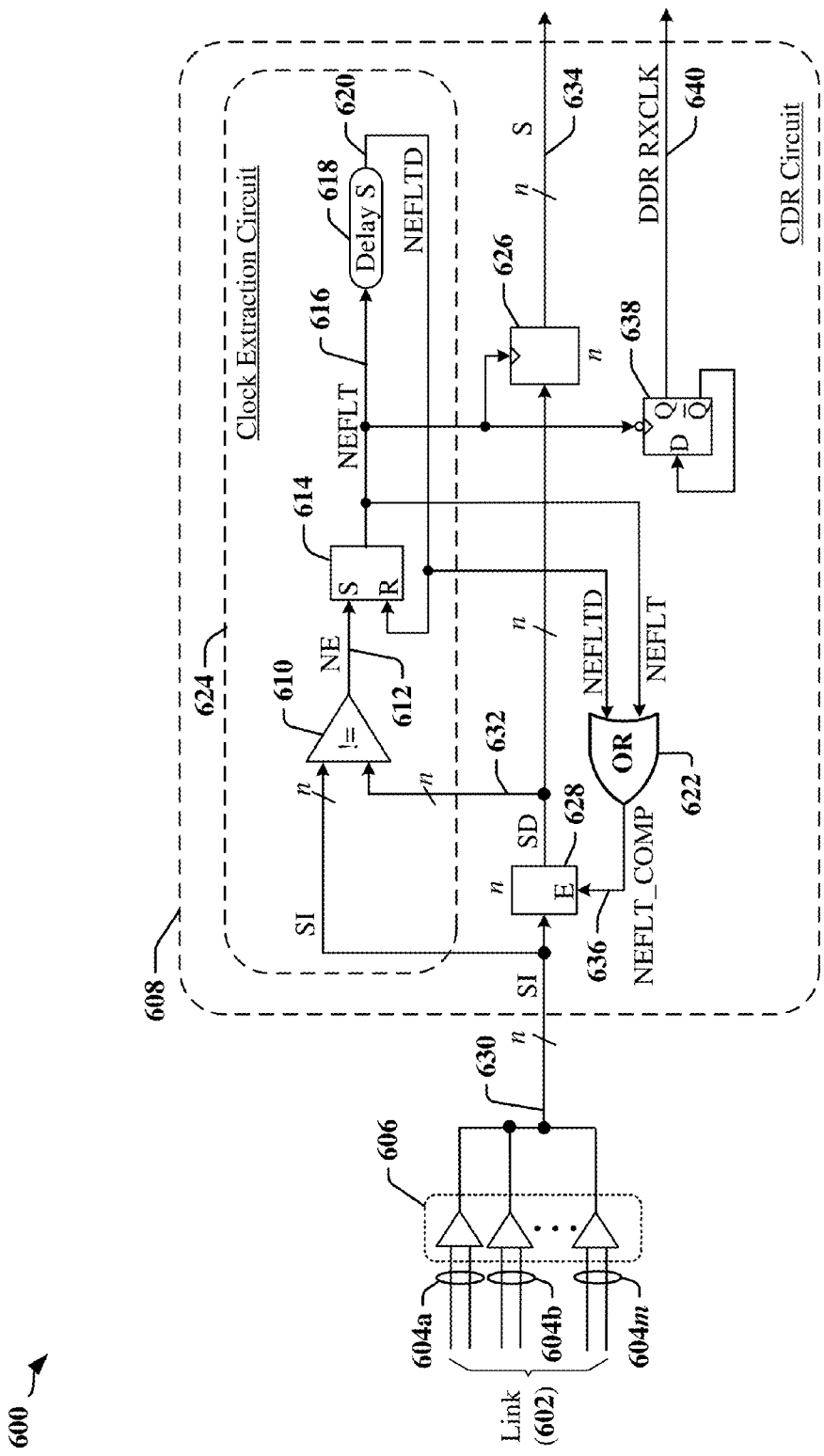
FIG. 6 is a block diagram depicting one example of a clock and data recovery circuit that illustrates certain aspects of clock and data recovery from a multi-wire interface.
Figure 7:
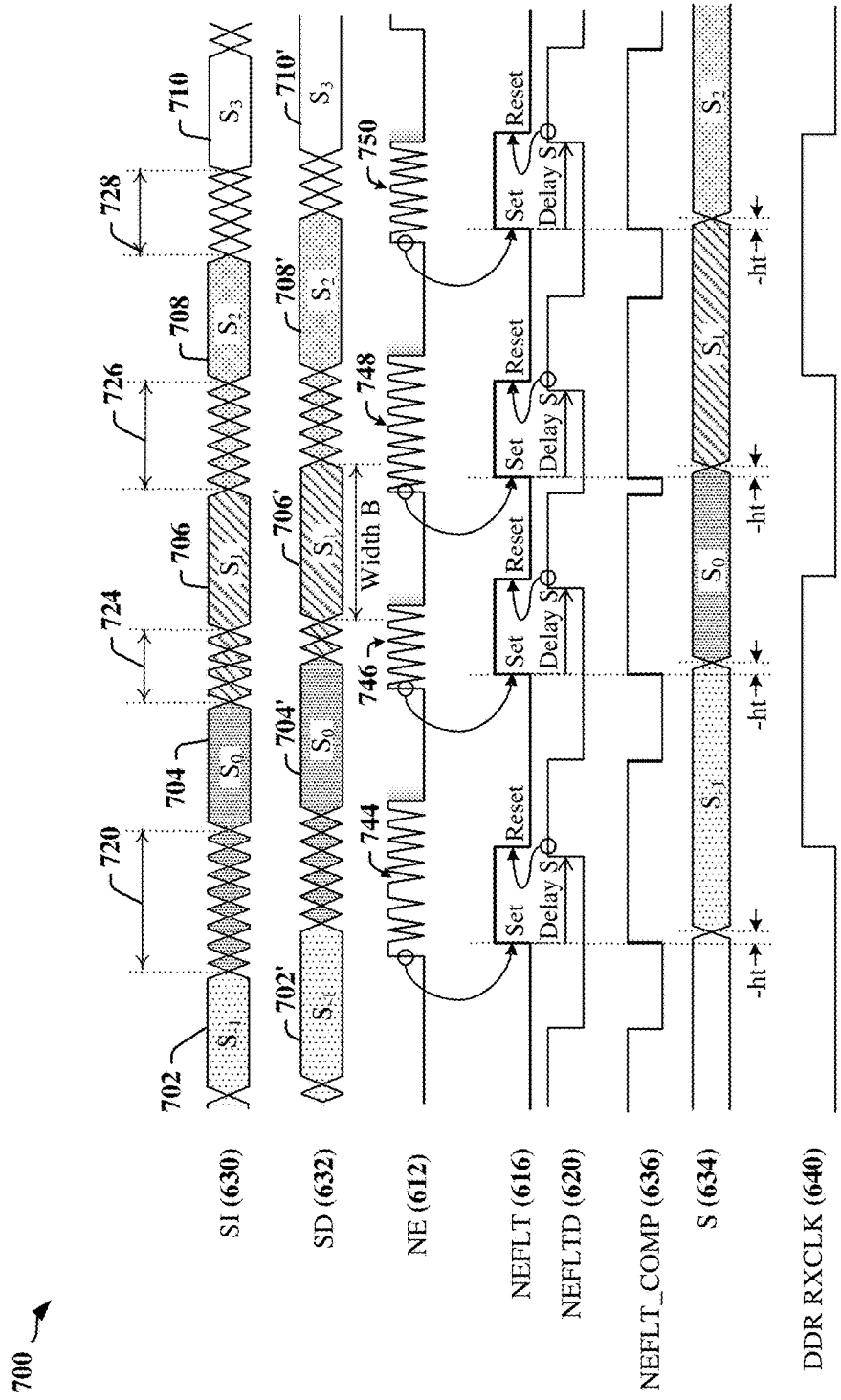
FIG. 7 is a timing diagram illustrating the operation of the clock and data recovery circuit illustrated in FIG. 6 under typical operating conditions.

FIG. 6 is a block diagram illustrating a receiver circuit 600 that includes a plurality of receivers 606, and an example of a clock and data recovery (CDR) circuit 608 that may be configured for use in a multi-wire communications interface according to certain aspects disclosed herein. FIG. 7 is a timing diagram 700 illustrating certain aspects of the operation of the CDR circuit 608. The CDR circuit 608 may be used with different types of multi-wire interfaces, including interfaces that use N! encoding, N-phase encoding, and other encoding schemes that use symbol transition clocking, including interfaces that employ a differential or single-ended multi-wire communication link 602. The wires of the communication link 602 may be organized as a plurality of lanes 604a, 604b, . . . 604m, each lane including one or more wire of the communication link 602.

In the illustrated example, differential receivers 606 are employed to receive data and clock signals from differentially encoded lanes 604a, 604b, . . . 604m implemented using pairs of wires of the communication link 602. In another example, the receivers 606 may include single-ended line receivers for use in a multiple-lane, single-ended communications link. In another example, each of a plurality of the differential receivers 606 may be coupled to different pairs of wires of the communication link 602 such that each wire may be coupled to more than one receiver 606.

The receivers 606 may be configured to produce an n-bit signal 630 that represents the signaling state of the communication link 602. The CDR circuit 608 may be employed to extract clock information received by the receivers 606 from one or more lanes 604a, 604b, . . . 604m of the communication link 602. In one example, the lanes 604a, 604b, . . . 604m may include the clock lane 326 and/or one or more of the data lanes 324 illustrated in the example of FIG. 3. Each of the receivers 606 may provide an output representative of the signaling state of its corresponding lane 604a, 604b, . . . 604m. The outputs of the receivers 606 contribute to an input state transition signal (SI) 630 from which a receive clock may be extracted. The combined signaling state of the one or more lanes 604a, 604b, . . . 604m may be representative of a symbol transmitted in a data transmission interval 508 or 528 (see FIG. 5).

In one example, clock information is embedded in symbol transitions in the transition signal 630, which may correspond to transitions in the signaling state of the plurality of wires or conductors of the communication link 602. The CDR circuit 608 may be configured to extract a clock and data symbols from the transition signal 630. In one example, the CDR circuit 608 includes a clock extraction circuit 624, flip-flop devices 626 configured to handle an n bit input/output, and level latches 628 configured to handle an n bit input/output. The clock extraction circuit 624 may include a comparator 610, a set-reset latch 614, and a first delay device (Delay S) 618. The clock extraction circuit 624 may be adapted to generate one or more clock signals that can be used to capture data from the transition signal 630. The CDR circuit 608 may provide jitter compensation, enabling the one or more clocking signals to sample symbols from signaling state transitions in the transition signal 630 received from the receivers 606.

In operation, the comparator 610 may compare the transition signal 630 with a delayed instance of the transition signal (the SD signal 632). The comparator 610 provides a comparison (NE) signal 612 to a "Set" input of the set-reset latch 614, which provides an output (NEFLT) signal 616 that is a filtered version of the comparison signal 612. The delay device 618 receives the NEFLT signal 616 and outputs a delayed instance of the NEFLT signal 616 as the NEFLTD signal 620. The delay device 618 may include analog and/or digital delay circuitry. The NEFLTD signal 620 serves as the "Reset" input to the set-reset latch 614 such that the output of the set-reset latch 614 is reset after a delay period provided by the delay device 618. In one example, the NEFLT signal 616 may be used to clock the flip-flop device 626 that samples symbols. The NEFLT signal 616 may also be used to generate a signal 636 that controls the level latch 628 that provides the SD signal 632.

In one example, the transition signal 630 may carry a clock signal that transitions between consecutive symbols. In some instances, the transition signal 630 may carry symbols that provide a guaranteed signaling state transition between each pair of consecutive symbols. That is, data may be encoded in the symbols such that the signaling state of at least one lane 604a, 604b, . . . and/or 604m changes at each transition between consecutive symbols.

The level latch 628 receives the transition signal 630 and provides the SD signal 632 as an output. The level latch 628 is triggered by an NEFLT_COMP signal 636 output by combinational logic, such as an OR gate 622, which combines the NEFLT signal 616 and NEFLTD signal 620. The flip-flop device 626 may also receive the SD signal 632 and provide an output signal (S) 634 that includes a sequence of symbols captured from the transition signal 630. In one example, the flip-flop device 626 may be triggered by the NEFLT signal 616. The flip-flop device 626 may be triggered by a rising edge on the NEFLT signal 616. Consequently, the level latch 628 provides a delayed version of the transition signal 630 and enables the comparator 610 to identify transitions between consecutive symbols. For example, the NE signal 612 may be at a logic high state when the inputs to the comparator 610 are different. The NE signal 612 serves to generate the NEFLT signal 616, which serves as a latching clock for the flip-flop device 626.

In operation, the state of the SI signal 630 begins to change when a transition occurs between a current symbol ($S_0$) 704 and a next symbol ($S_1$) 706. The NE signal 612 transitions high when the comparator 610 first detects a difference between the SI signal 630 and the SD signal 632, causing the set-reset latch 614 to be asynchronously set. Accordingly, the NEFLT signal 616 transitions high, and this high state is maintained until the set-reset latch 614 is reset when the NEFLTD signal 620 becomes high. The NEFLT signal 616 transitions to a high state in response to the rising edge of the NE signal 612, and the NEFLT signal 616 transitions to a low state in response to the rising edge of the NEFLTD signal 620 after a delay attributable to the first analog delay device (Delay S) 618.

As transitions between symbols 702, 704, 706, 708, and 710 occur, one or more intermediate or indeterminate states 720, 724, 726, 728 may occur on the SI signal 630 due to inter-wire skew, signal overshoot, signal undershoot, crosstalk, and so on. The intermediate states on the SI signal 630 may be regarded as invalid data, and these intermediate states may cause spikes 744, 746, 748, and 750 in the NE signal 612 as the output of the comparator 610 returns towards a low state for short periods of time. The spikes 744, 746, 748, and 750 do not affect the NEFLT signal 616 that is output by the set-reset latch 614. The set-reset latch 614 effectively blocks and/or filters out the spikes 744, 746, 748, and 750 on the NE signal 612 from the NEFLT signal 616.

The flip-flop device 626 may have a negative hold time (−ht) as the input symbols 702, 704, 706, 708, and 710 in the SI signal 630 can change prior to the symbol being latched or captured by the flip-flop device 626. For instance, each symbol 702', 704', 706' and 708' in the SD signal 632 is set or captured by the flip-flop device 626 at the rising clock edge of the NEFLT signal 616, which occurs after the input symbols 702, 704, 706, 708, and 710 have changed in the SI signal 630.

The CDR circuit 608 may provide one or more clock signals to be used by other devices and/or circuits to extract symbols in the S signal 634. In one example, the CDR circuit 608 may provide a DDR receive clock (DDR RXCLK) signal 640 by dividing the NEFLT signal 616 or the NEFLTD signal 620. In the illustrated example, the DDR RXCLK signal 640 is output by the flip-flop 638, which is toggled at each falling edge of the NEFLT signal 616.

The CDR circuit 608 illustrated in FIG. 6 is provided as one example of a circuit used to recover a clock signal from a communications interface and/or to capture data from the interface. The CDR circuit 608 may be adapted or configured to accommodate design goals for different types of interface, to optimize performance at different data transmission rates, and for other reasons.

Figure 8:
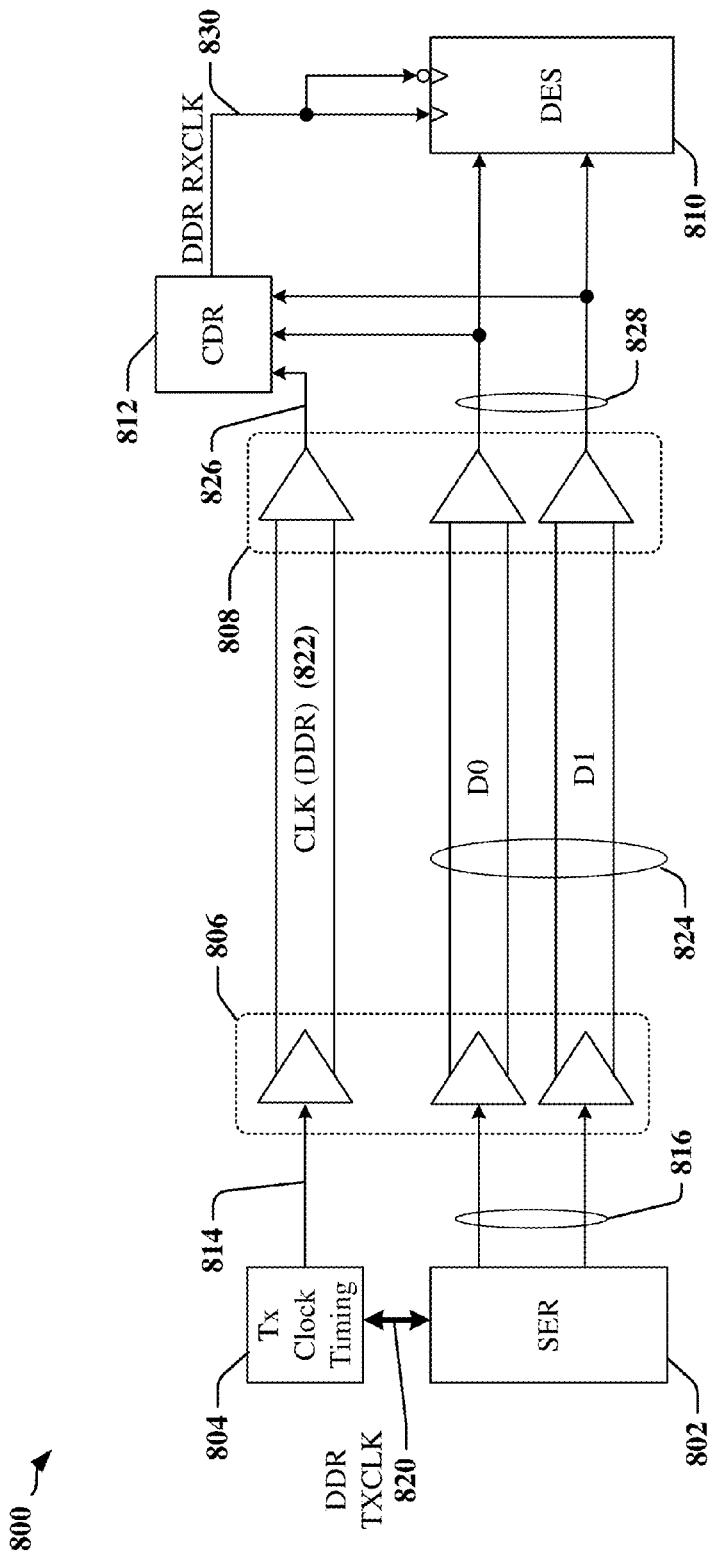
FIG. 8 illustrates a first example of a communications link that employs a clock and data recovery circuit adapted according to certain aspects disclosed herein.

FIG. 8 illustrates a first example 800 of a communications link that employs a CDR circuit 812 to produce a reliable DDR receive clock (DDR RXCLK) signal 830. The CDR circuit 812 may generate the DDR RXCLK signal 830 by detecting the first-occurring transition on any of a clock signal 826 received from a clock lane 822 and signals 828 received from one or more data lanes 824. For example, the edges in the DDR RXCLK signal 830 may be generated at each transition between transmission intervals 914 (see FIG. 9) using the first detected transition, whether the first detected transition is a change in state of the clock lane 822 or a change in state of a monitored data lane 824.

In the illustrated example, the clock signal 814 transmitted on the clock lane 822 may be derived directly from the transmitter clock (DDR TXCLK) signal 820 used to produce data signals 816 for transmission on two data lanes 824. Transitions in the signaling state of the clock signals 814 and/or 820 may be aligned with transitions of the data signals 816 to be transmitted on the data lanes 824. Accordingly, transitions of the clock signal 826 received from the clock lane 822 may be substantially aligned with corresponding transitions on the data signals 828 received from the data lanes 824. The transitions of the data signals 828 received from the data lanes 824 and/or the clock lane 822 may be imperfectly aligned due to differences in the electrical and physical characteristics of the transmission paths included in the clock lane 822 and/or the data lanes 824. The CDR circuit 812 may be configured to account for a transition region that includes timing differences between signals transmitted over different ones of the data lanes 824 and/or the clock lane 822. According to certain aspects disclosed herein, the CDR circuit 812 may generate an edge on the DDR RXCLK signal 830 based on the first transition detected on a signal 826, 828 received from any of the clock lane 822 or the data lanes 824. Subsequent transitions on the signals 826, 828 received from any of the clock lane 822 or the data lanes 824 may be ignored if, for example, they occur within a time period calculated based on the durations of respective transition regions.

As depicted in the illustrated example, the SER 802 may be configured to use a slower DDR transmit clock signal. In some instances, the SER 802 may be clocked using a higher frequency SDR clock signal.

Figure 9:
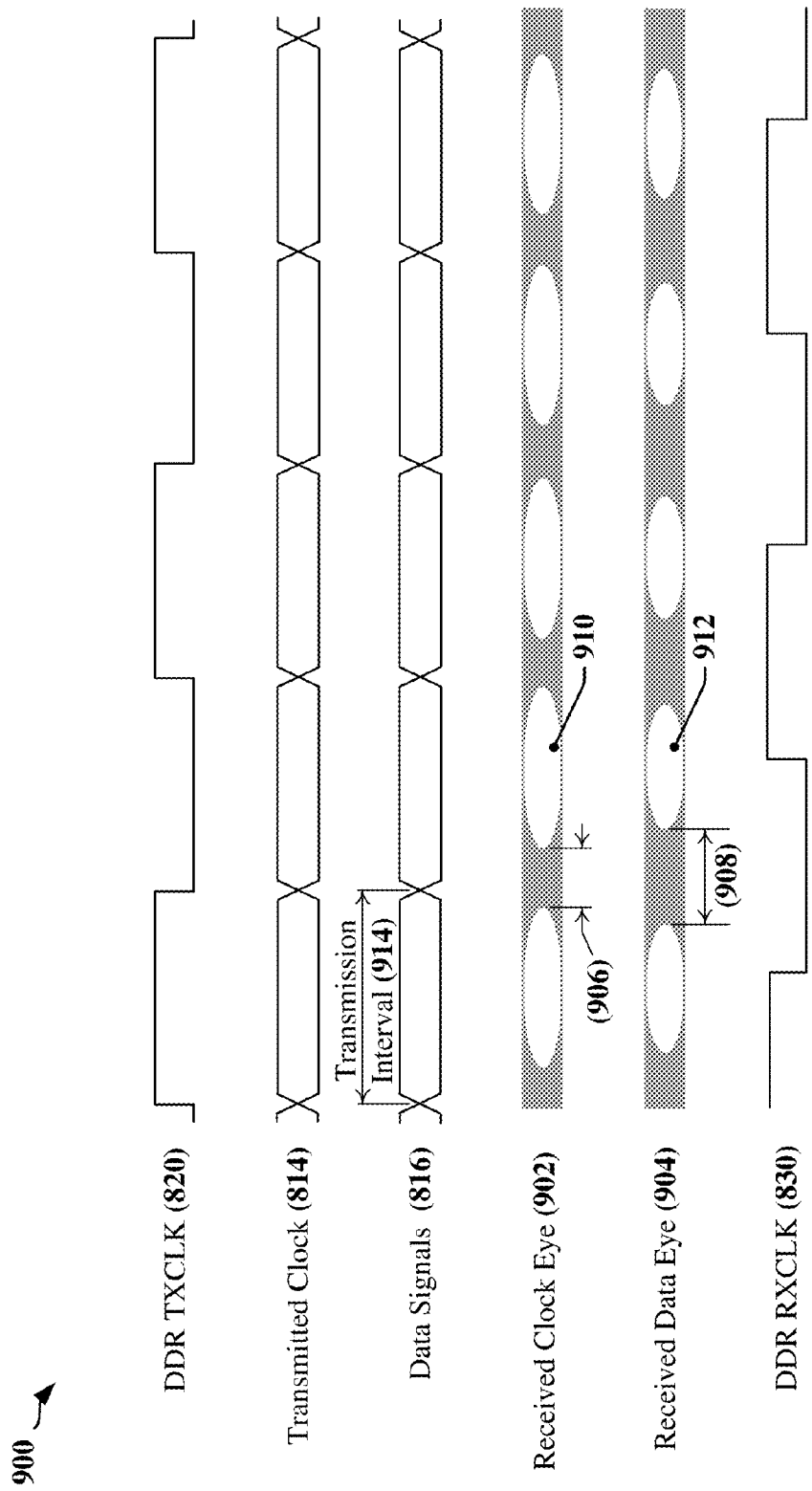
FIG. 9 illustrates timing of certain signals associated with the communications link illustrated in FIG. 8.

FIG. 9 is a timing diagram 900 illustrating an example of the timing of signals associated with the interface illustrated in FIG. 8. According to certain aspects, the transmitted clock signal 814 may be an inverted or non-inverted version of a DDR transmitter clock signal 820, and the data signals 816 may be generated based on edges of the DDR transmitter clock signal 820. Accordingly, the edges of the transmitted clock signal 814, the data signals 816, and the DDR transmitter clock signal 820 may be in substantial alignment. The clock lane 822 and each of the data lanes 824 may have similar electrical and physical characteristics and the differential drivers 806 and differential receivers 808 on the data lanes 824 may have similar timing tolerances, such that the clock lane 822 and the data lanes 824 may individually have transition regions and/or eye regions that are of similar duration. In a multi-lane interface, the eye region 912 in a combined data eye diagram 904 represents a plurality of data lanes 824 and may be smaller than the eye region 910 in the clock eye diagram 902. The difference in sizes of the eye regions 910 and 912 may be attributed to differences in jitter between the data lanes 824 and/or between the clock lane 822 and the data lanes 824. In some instances, jitter in the data lanes 824 may include pattern jitter that is based on data patterns and that does not affect the jitter found in the clock lane 822. In some instances, jitter in the data lanes 824 includes jitter generated by the SER 802 and/or driver circuits 806 that drive the data lanes 824, in addition to jitter from the clock generation circuit 804 that controls timing of the SER circuit 802 and provides the clock signal transmitted on the clock lane 822.

The CDR circuit 812 may be configured or adapted to generate the DDR RXCLK signal 830 based on the first-detected transitions between successive transmission intervals 914. In one example, transitions in the DDR RXCLK signal 830 may be provided near the center of the eye regions 910, 912, or toward the end of the eye regions 910, 912. In another example, transitions in the DDR RXCLK signal 830 may be provided at a predefined time interval or delay after the beginning of one or more of the transition regions 906 and/or 908. In another example, transitions in the DDR RXCLK signal 830 may be provided at a predefined time interval or delay before the termination of one or more of the transition regions 906 and/or 908.

The edges of the DDR RXCLK signal 830 may be shifted with respect to the first-detected transition, which may be assumed to occur at a given point within the transition region 906 or 908. Accordingly, the edges of the DDR RXCLK signal 830 may be generated between transitions of the data signals in the data lanes 824. A CDR circuit 812 may be configured or adapted according to certain aspects disclosed herein to generate edges in the DDR RXCLK signal 830 that reliably and consistently occur within the eye region 912 of the received data signals 828. An interface may employ higher data transmission rates when the CDR circuit 812 is configured or adapted according to certain aspects disclosed herein.

Figure 10:
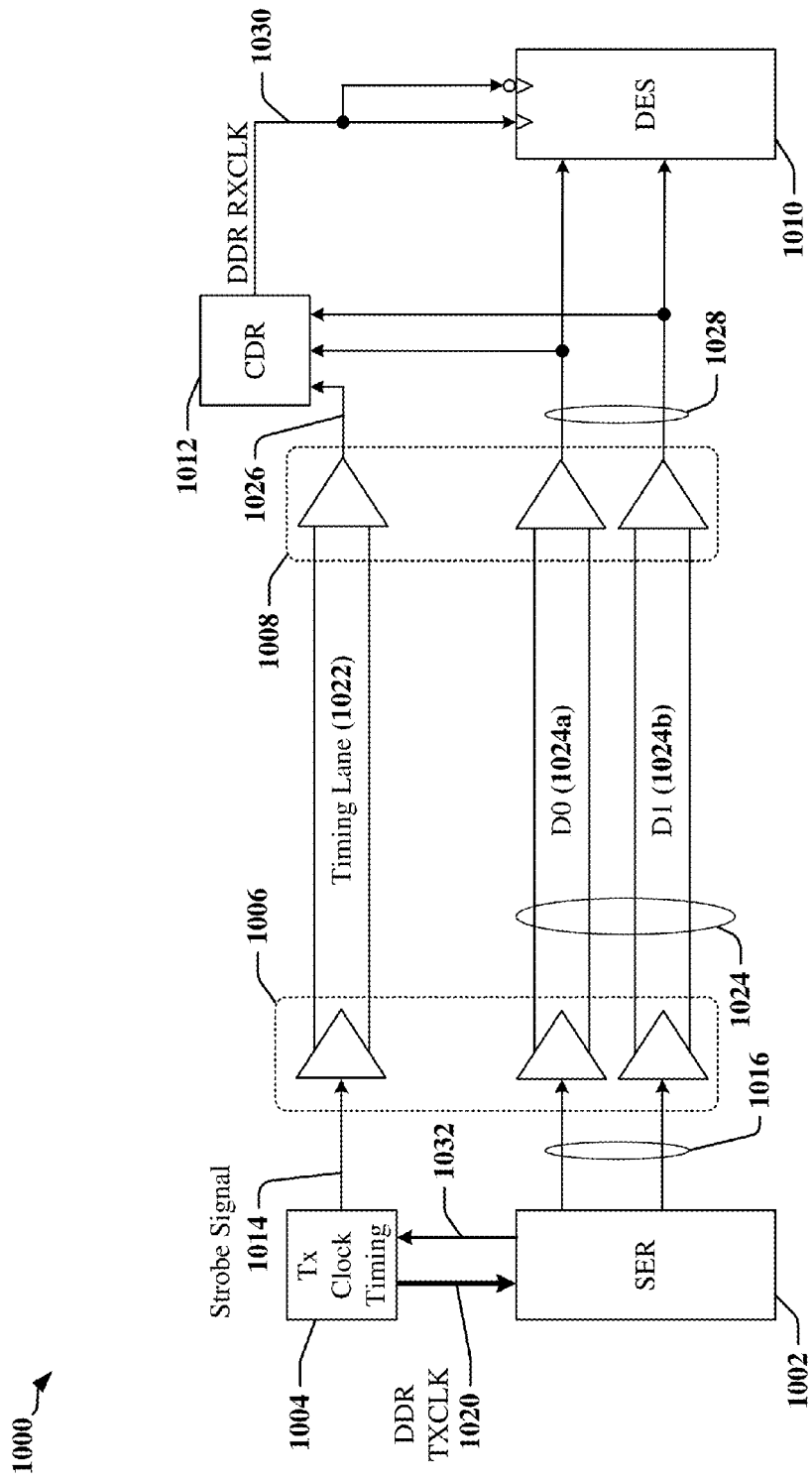
FIG. 10 illustrates a second example of a communications link that employs a clock and data recovery circuit adapted according to certain aspects disclosed herein.

FIG. 10 illustrates a second example of an interface that employs a CDR circuit 1012 according to one or more aspects disclosed herein. In this example, a strobe signal 1014 may be generated for transmission in place of a clock signal. The strobe signal 1014 may be transmitted over a timing lane 1022. In some instances, the interface may be configurable to provide either the strobe signal 1014 or a clock signal 814 (see FIG. 8) on the timing lane 1022.

Figure 11:
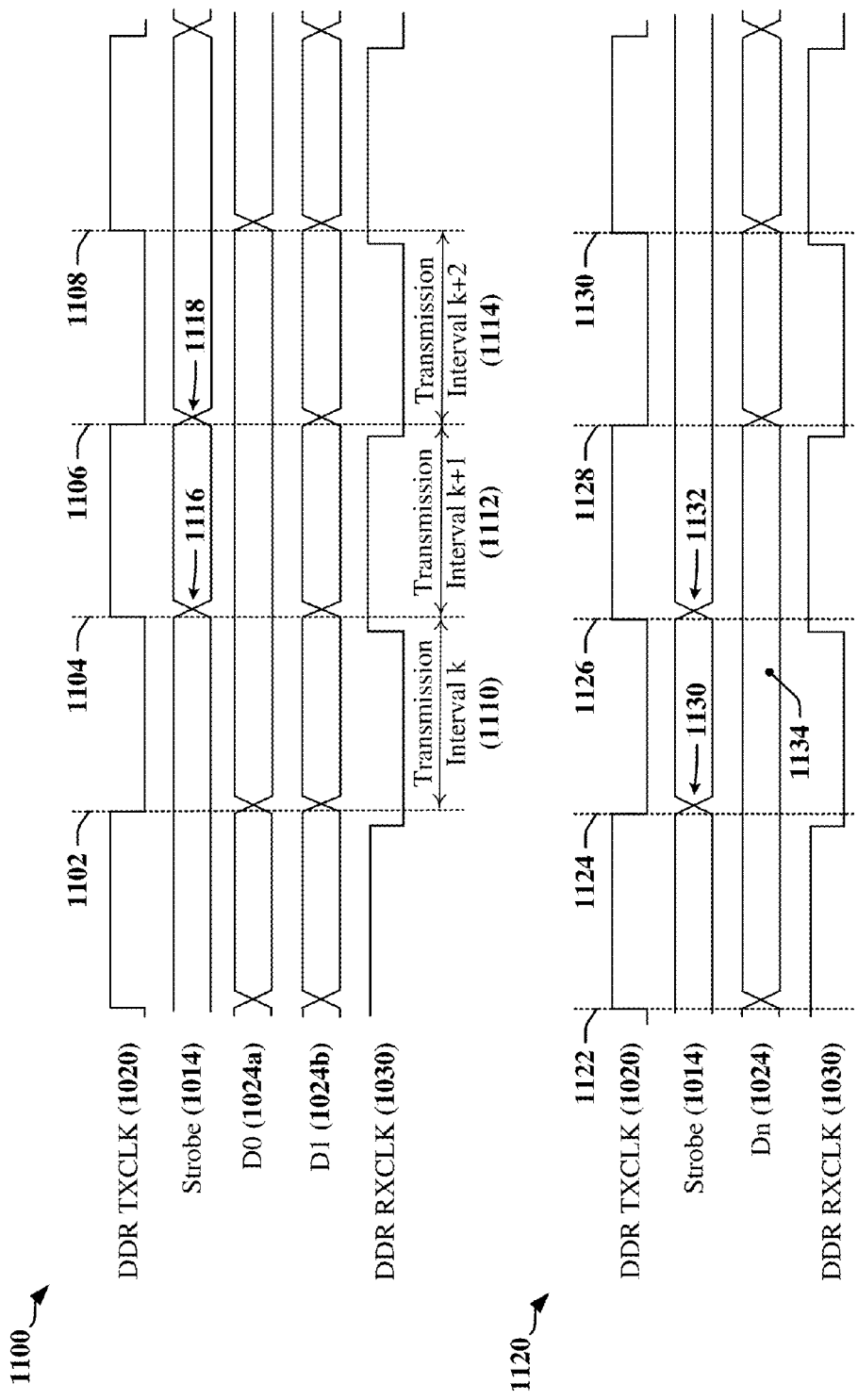
FIG. 11 illustrates timing of certain signals associated with the communications link illustrated in FIG. 10.

The strobe signal 1014 may be generated by a transmit clock timing circuit 1004 based on information 1032 received from the SER 1002 that indicates whether a transition in state of one or more of the data signals 1016 has occurred, or is expected to occur at a boundary between transmission intervals 1110, 1112, 1114 (see FIG. 11). The one or more data signals 1016 may be associated with data lanes 1024 monitored by the CDR circuit 1012 for the purpose of generating edges on the receive clock signal 1030. In one example, the transmit clock timing circuit 1004 generates an edge on the strobe signal 1014 when no transition has occurred or is expected to occur on all of the data signals 1016 corresponding to data lanes 1024 monitored by the CDR circuit 1012.

In another example, the transmit clock timing circuit 1004 generates an edge on the strobe signal 1014 when no transition has occurred or is expected to occur on fewer than all of the data signals 1016, even if all of the data signals 1016 are transmitted on data lanes 1024 monitored by the CDR circuit 1012. In one example, the SER 1002 reports absence/presence of transitions on only a first data lane 1024*a*. The number of data signals reported by the SER 1002 may be defined based on the encoding technology used to encode data in the data signals 1016, limitations set on hardware complexity, power budget and/or other factors. In one example, the complexity of determining transitions on each of a 64-lane interface may be unwarranted when a reliable receiver clock signal 1030 can be generated from a small percentage of the 64 data lanes. In another example, the SER 1002 may report on a limited number of data signals in order to increase the number of edges provided on the strobe signal 1014.

The CDR circuit 1012 can reliably generate transitions on the receiver clock signal 1030 when at least one signal transition is guaranteed to occur at the boundary 1102, 1104, 1106 between data transmission intervals 1110, 1112, 1114 (see FIG. 11) in at least one of the received data signals 1028 or in the received strobe signal 1026. The strobe signal 1014 may be transmitted over the clock lane of a differential data communications link in place of a clock signal. Power consumption of the link may be reduced because the strobe signal 1014 typically toggles less frequently than a free-running DDR clock signal.

FIG. 11 includes timing diagrams 1100, 1120 that illustrate examples of transmission schemes that use a strobe signal 1014 as described in relation to FIG. 10. A first timing diagram 1100 relates to a transmission scheme in which an edge 1116, 1118 is provided on the strobe signal 1014 when a first data lane 1024*a* does not change state proximate to the occurrence of an edge on the DDR transmit clock signal 1020. The edge on the DDR transmit clock signal 1020 marks the boundary between successive data transmission intervals. For example, a $k^{th}$ data transmission interval 1110 may begin at a first point in time (boundary 1102) and a $(k+1)^{th}$ data transmission interval 1112 may begin at a second point in time (boundary 1104). If the signaling state of the first data lane 1024*a* remains constant through the $k^{th}$ and $(k+1)^{th}$ data transmission intervals 1110, 1112, then an edge 1116 may be generated on the strobe signal 1014.

In the depicted example, the signaling state of the first data lane 1024*a* remains constant during the $k^{th}$ data transmission interval 1110, the $(k+1)^{th}$ data transmission interval 1112 and the $(k+2)^{th}$ data transmission interval 1114 that commences at a third point in time (boundary 1106). According to certain aspects, edges 1116, 1118 may be introduced to the strobe signal 1014 at the boundaries between the $k^{th}$ data transmission interval 1110 and the $(k+1)^{th}$ data transmission interval 1112, and between the $(k+1)^{th}$ data transmission interval 1112 and the $(k+2)^{th}$ data transmission interval 1114. These edges 1116, 1118 on the strobe signal occur at or near the second and third points in time (boundaries 1104, 1106) respectively. The signaling state of the first data lane 1024a changes at a fourth point in time 1108 and the strobe signal 1014 may be unchanged at that time 1108.

In the example illustrated by the first timing diagram 1100, the first data lane 1024a is monitored by circuitry that generates the strobe signal 1014. The example may be representative of other examples where less than all of the data lanes 1024 are monitored for the purpose of generating a strobe signal 1014. The data lanes may include more than the two data lanes 824 depicted in FIG. 8.

In some instances, a plurality of timing lanes 1022 may be employed. The DDR receive clock signal 1030 may be generated based on transitions detected on one or more of the data lanes 824 and/or a strobe signal on a timing lane 1022. As depicted, the DDR receive clock signal 1030 is configured to provide sampling edges close to the end of each data transmission interval 1110, 1112, 1114.

The second timing diagram 1120 relates to a transmission scheme in which an edge 1130, 1132 is provided on the strobe signal 1014 when none of the data lanes 1024 change state proximate to the occurrence of an edge on the DDR transmit clock signal 1020. As noted supra, the edges on the DDR transmit clock signal 1020 mark the boundaries between successive data transmission intervals.

In the depicted example, the signaling state of the data lanes remains constant 1134 for three data transmission intervals that commence at first, second and third points in time 1122, 1124 and 1126. A transition occurs on at least one of the data lanes 1024 at or near fourth and fifth points in time 1128, 1130. According to certain aspects, edges 1130, 1132 may be introduced to the strobe signal 1014 when the signaling state of the data lanes 1024 does not change between successive data transmission intervals.

In the example illustrated by the second timing diagram 1120, two data lanes 1024 are monitored by circuitry that generates the strobe signal 1014. The example may be representative of other examples where multiple data lanes 1024 are monitored for the purpose of generating a strobe signal 1014. The data lanes 1024 may include more than the two data lanes 1024a, 1024b depicted.

A data lane 1024 that is idle for a prolonged period of time may be afflicted by certain undesirable signaling effects. For example, when the state of a data lane 1024 is maintained at the same high or low value for a number of sequential symbol or data intervals, direct current (DC) voltages on signal wires may drift towards a rail voltage or bias voltage. Such drift may result in signaling inertia that affects the timing of later transitions and that can introduce additional skew or jitter. Some encoding schemes may be configured to monitor the state of the signal wires for a predetermined number of consecutive intervals that produced no transitions in a data lane 1024, and to introduce transitions to combat resulting undesirable effects. In one example, an encoder may add two data symbols after a number of consecutive intervals that produced no transitions in a data lane. The two added symbols cause a transition away from, and then back to a state that has been unchanged for the number of consecutive intervals. In one example, two data symbols may be introduced after a signal has been in the same state for 8 data intervals. At the receiver, the two added symbols are discarded. In this scheme, the operation of the strobe signal 1014, 1026 is unaffected by the addition of data symbols.

The received strobe signal 1026 may itself be affected by DC drift and may suffer effects attributable to prolonged periods of time when no transitions occur on the timing lane 1022 carrying the strobe signal 1014. The strobe signal 1014 may be in a fixed and/or continuous state if transitions occur in one or more data lanes 1024 for a prolonged sequence of data intervals. This effect is more pronounced when the strobe signal 1014 is generated based on the presence or absence of transitions in multiple data lanes 1024. In some examples, additional transitions may be introduced to the strobe signal 1014 after the state of the strobe signal 1014 has been unchanged for a predetermined number of data intervals. The additional transitions on the strobe signal 1014 may be substantially aligned with boundaries between sequential data transmission intervals 1110, 1112, 1114. The additional transitions may be ignored by the CDR circuit 1012 if a transition is first detected on the data lanes 1024.

Figure 12:
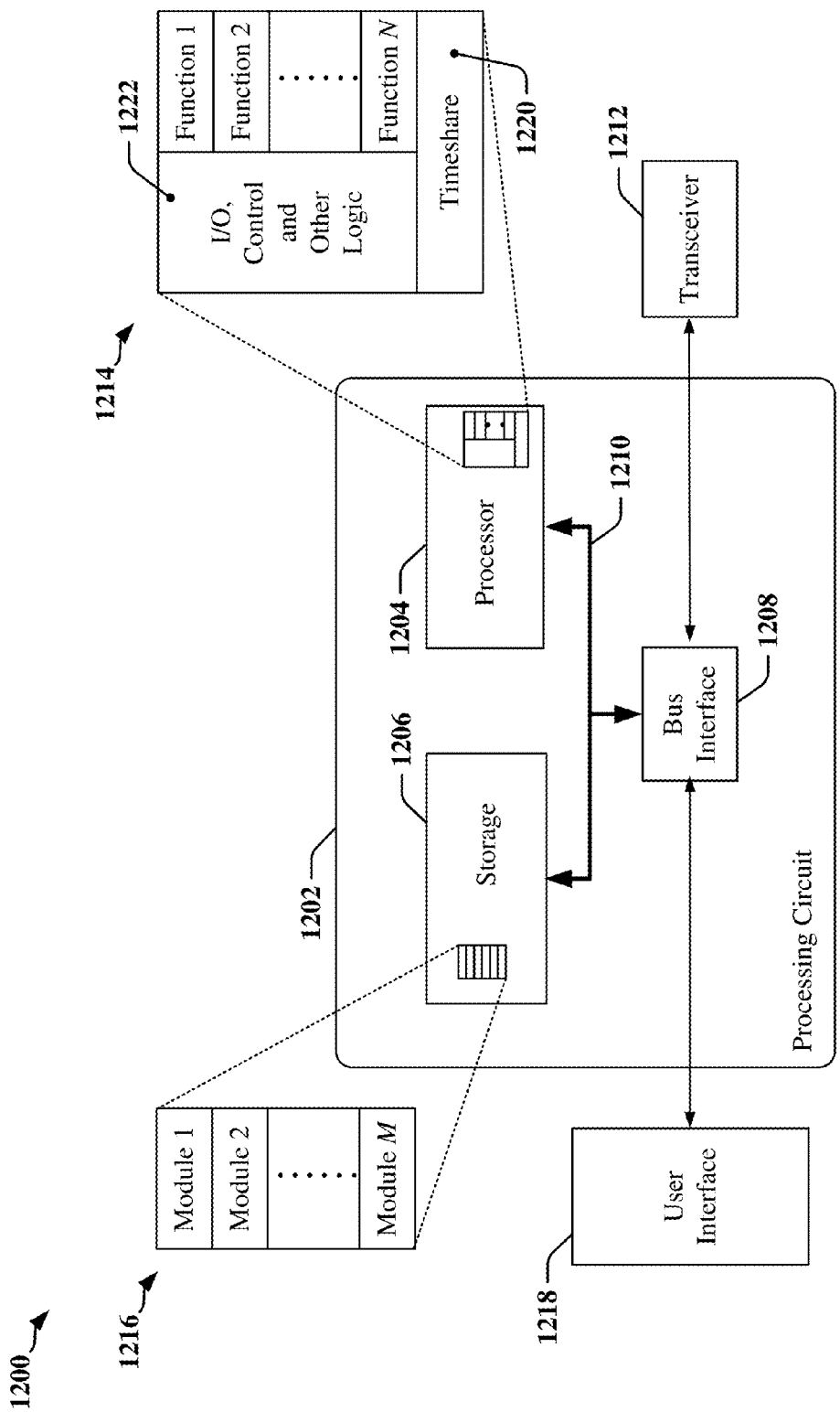
FIG. 12 illustrates a simplified example of a hardware implementation for an apparatus employing a processing circuit that may be adapted or configured to perform one or more functions disclosed herein.

FIG. 12 is a conceptual diagram 1200 illustrating a simplified example of a hardware implementation for an apparatus employing a processing circuit 1202 that may be configured to perform one or more functions disclosed herein. For example, the processing circuit may be deployed as the processing circuit 102 of FIG. 1, at least a portion of the device 202 or the device 230 of FIG. 2, etc. In accordance with various aspects of the disclosure, an element, or any portion of an element, or any combination of elements as disclosed herein may be implemented using the processing circuit 1202. The processing circuit 1202 may include one or more processors 1204 that are controlled by some combination of hardware and software modules. Examples of processors 1204 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212. A transceiver 1212 may be provided for each networking technology supported by the processing circuit. In some instances, multiple networking technologies may share some or all of the circuitry or processing modules found in a transceiver 1212. Each transceiver 1212 provides a means for communicating with various other apparatus over a transmission medium. Depending upon the nature of the apparatus, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as the transceiver 1212, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to the transceiver 1212, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

Figure 13:
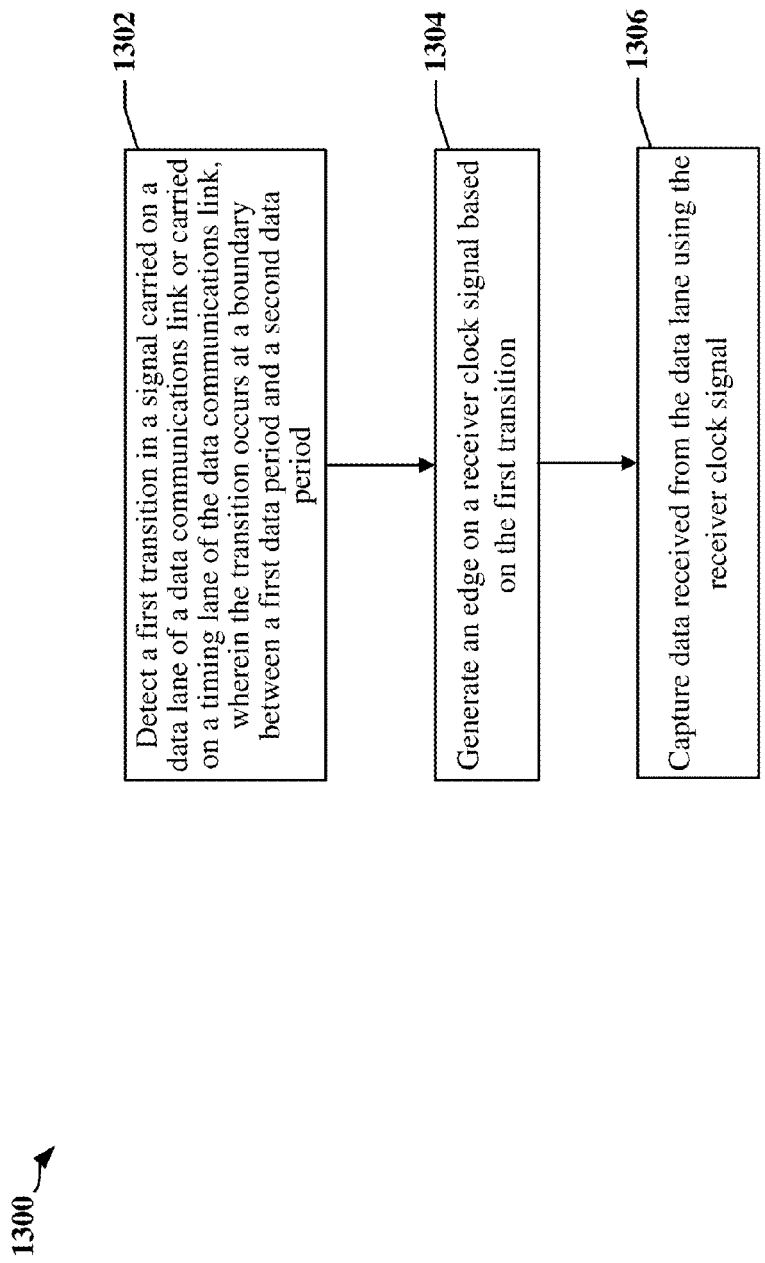
FIG. 13 is a flowchart of a method that can enhance data rates on a multi-lane differential communications link.

FIG. 13 is a flowchart illustrating a method for data communications on a multi-lane differential communications link 220. The communications link 220 may include a plurality of connectors that carry symbols encoded using a suitable encoding scheme such as multi-lane differential encoding. The connectors may include electrically conductive wires, optical signal conductors, semi-conductive interconnects and so on. The method may be performed by one or more processors of a decoder and/or a device that interacts or houses the decoder.

At step 1302, a first transition is detected in a signal carried on a data lane of a data communications link or carried on a timing lane of the data communications link. The transition may occur at a boundary between a first data period and a second data period. The timing lane may carry a DDR clock signal. Transitions of the DDR clock signal may be aligned with transitions of the data received from the data lane. The timing lane may carry a strobe signal that transitions between signaling states when no transition occurs in data received from the data lane at a boundary between a third data period and a fourth data period. The timing lane may carry a strobe signal that transitions between signaling states when no state transition occurs on any of a plurality of data lanes proximate to the boundary between a third data period and a fourth data period.

At step 1304, an edge is generated on a receiver clock signal based on the first transition. The receiver clock signal may be unaffected by one or more additional transitions occurring in relation to the boundary between the first data period and the second data period when the one or more additional transitions occur after the edge has been generated. The first data period may occur before the second data period. The edge may be used to capture a delayed version of data transmitted in the first data period.

At step 1306, data received from the data lane is captured using the receiver clock signal. The receiver clock signal may be used to deserialize data received from one or more data lanes.

In one example, the first transition may be detected by monitoring a plurality of data lanes as well as the timing lane. The first transition may be a transition on any of the plurality of data lanes and timing lane that is the first-occurring transition. Subsequent transitions on any of the plurality of data lanes and timing lane may be ignored when these subsequent transitions occur within a predefined time interval. The predefined time interval may be determined by the duration of the transition regions associated with the plurality of data lanes and timing lane.

The data lanes and/or timing lane may carry differentially encoded signals. The timing lane may be configured or adapted to carry one of a clock signal or strobe signal. The clock signal may be a DDR signal, for example.

In another example, a first symbol representative of the signaling state of a plurality of lanes that includes the timing lane and the data lane during the first data period is compared with a second symbol representative of the signaling state of the plurality of lanes during the second data period. The timing lane may carry a strobe signal that transitions between signaling states when no transition occurs in the signaling state of the data lane between the first data period and the second data period. The strobe signal may transition between signaling states when no state transition occurs in the signaling state of a plurality of data lanes between the first data period and the second data period.

Figure 14:
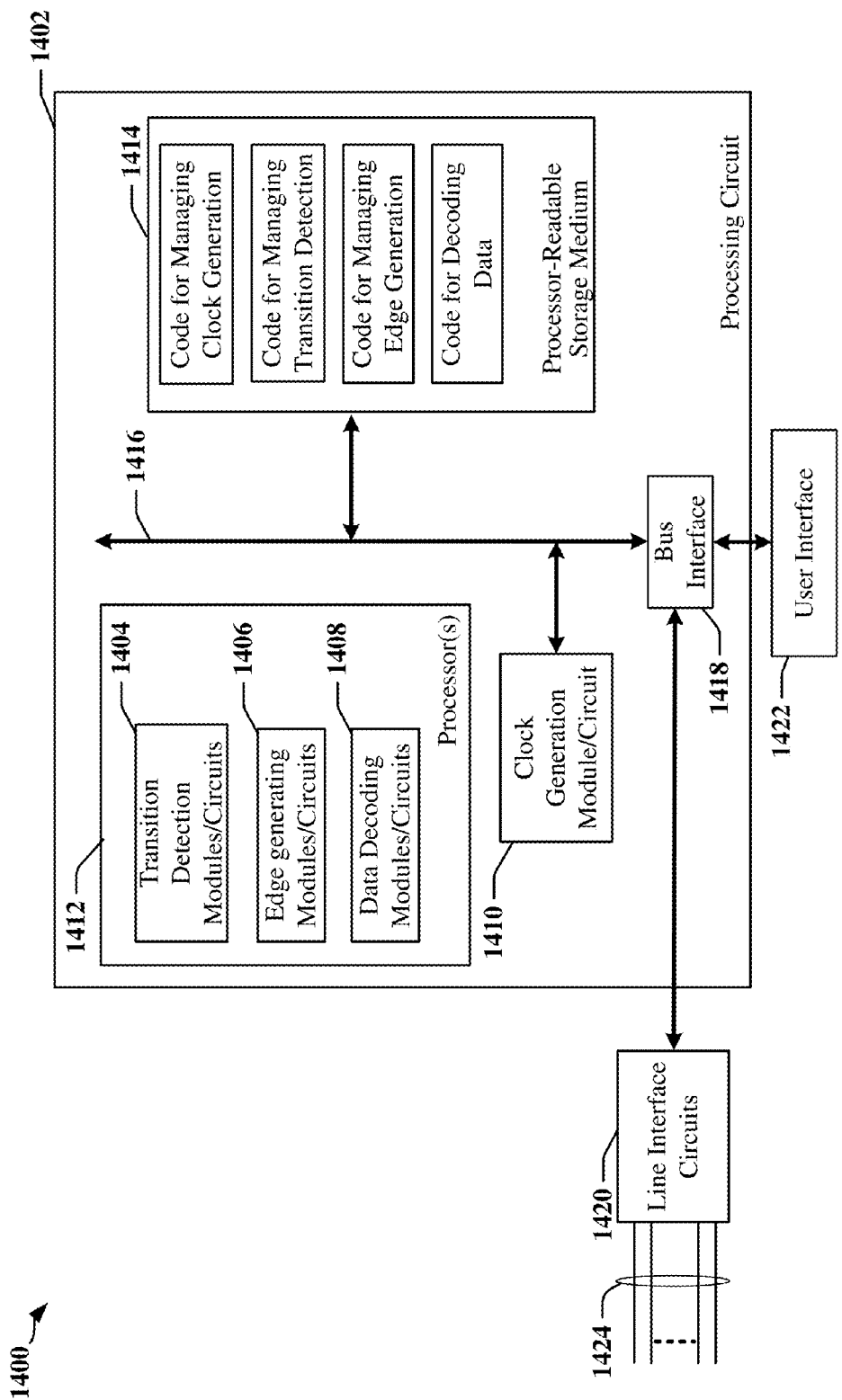
FIG. 14 is a diagram illustrating an example of a hardware implementation for an apparatus adapted or configured to perform one or more functions disclosed herein.

FIG. 14 is a conceptual diagram illustrating an example of a hardware implementation for an apparatus 1400 employing a processing circuit 1402. In this example, the processing circuit 1402 may be implemented with a bus architecture, represented generally by the bus 1416. The bus 1416 may include any number of interconnecting buses and bridges depending on the specific application of the processing circuit 1402 and the overall design constraints. The bus 1416 links together various circuits including one or more processors, represented generally by the processor 1412, line interface circuits 1420 configurable to communicate over connectors or wires 1424, and computer-readable media, represented generally by the processor-readable storage medium 1414. The bus 1416 may also link various other circuits such as timing sources, timers, peripherals, voltage regulators, and power management circuits. A bus interface 1418 provides an interface between the bus 1416, and the line interface circuits 1420. Depending upon the nature of the apparatus, a user interface 1422 (e.g., keypad, display, speaker, microphone, joystick) may also be provided. One or more clock generation circuits or modules 1410 may be provided within the processing circuit 1402 or controlled by processing circuit 1402 and/or one or more processors 1412. In one example, the clock generation circuits or modules 1410 may include one or more crystal oscillators, one or more phase-locked loop devices, and/or one or more configurable clock trees.

The processor 1412 is responsible for managing the bus 1416 and general processing, including the execution of software stored on the processor-readable storage medium 1414. The software, when executed by the processor 1412, causes the processing circuit 1402 to perform the various functions described supra for any particular apparatus. In one example, the software is provided to configure, initiate, control and/or otherwise manage various functions, circuits and modules of the processing circuit 1402. The processor-readable storage medium 1414 may be used for storing data that is manipulated by the processor 1412 when executing software, including data decoded from symbols transmitted over the connectors or wires 1424, including data decoded from signals received on the connectors or wires 1424, which may be configured as data lanes and clock lanes.

In one configuration, the processing circuit 1402 may include modules and/or circuits 1410 for clock generation, which may include a CDR, and other logic and circuitry. The processing circuit 1402 may include transition detection modules and/or circuits 1404 for detecting a first transition in one of a data lane of a data communications link and a timing lane of the data communications link, edge generating modules and/or circuits 1404 for generating an edge of a receiver clock signal based on the first transition, and data decoding modules and/or circuits 1406 for decoding data received from the data lane using the receiver clock signal.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A method of data communications, comprising:
receiving a plurality of data signals from a plurality of data lanes of a data communications link in accordance with a double data rate clock signal received from a timing lane of the data communications link, wherein each transition of the double data rate clock signal is aligned with a boundary between two data periods;

detecting a first-occurring transition on the data communications link at a boundary between a first data period and a second data period, whether the first-occurring transition occurs in a data signal carried on a data lane or in the double data rate clock signal, by comparing signaling state of the data communication link corresponding to the first data period with signaling state of the data communication link corresponding to the second data period;

generating an edge on a receiver clock signal based on the first-occurring transition; and capturing data received from the plurality of data lanes using the receiver clock signal.

2. The method of claim 1, further comprising:
deserializing data received from one or more data lanes using the receiver clock signal.

3. The method of claim 1, wherein each data lane in the plurality of data lanes is carried on a pair of differentially driven wires.

4. The method of claim 1, and further comprising:
storing a first symbol representative of the signaling state of the data communication link corresponding to the first data period;
and wherein detecting the first-occurring transition comprises:
comparing the first symbol with a second symbol representative of the signaling state of the data communication link corresponding to the second data period,
wherein the first-occurring transition occurs at the transition between the first symbol and the second symbol.

5. The method of claim 4, wherein the first-occurring transition occurs on one of the plurality of data lanes.

6. The method of claim 4, wherein the first-occurring transition occurs in the double data rate clock signal.

7. The method of claim 1, wherein the receiver clock signal is unaffected by one or more additional transitions on the data communications link occurring in relation to the boundary between the first data period and the second data period when the one or more additional transitions occur after the edge has been generated.

8. The method of claim 7, wherein the first data period occurs before the second data period, and wherein the edge is used to capture a delayed version of data transmitted in the first data period.

9. An apparatus, comprising:
a processing circuit configured to:
receive a plurality of data signals from a plurality of data lanes of a data communications link in accordance with a double data rate clock signal received from a timing lane of the data communications link, wherein each transition of the double data rate clock signal is aligned with a boundary between two data periods;
store signaling state of the data communication link corresponding to the first data period;
detect a first-occurring transition on the data communications link at a boundary between a first data period and a second data period, whether the first-occurring transition occurs in a data signal carried on a data lane or in the double data rate clock signal, by comparing the stored signaling state of the data communication link corresponding to the first data period with signaling state of the data communication link corresponding to the second data period;
generate an edge on a receiver clock signal based on the first-occurring transition; and
capture data received from the plurality of data lanes using the receiver clock signal.

10. The apparatus of claim 9, wherein the processing circuit configured to deserialize data received from one or more data lanes using the receiver clock signal.

11. The apparatus of claim 9, wherein the receiver clock signal is unaffected by one or more additional transitions occurring on the data communications link in relation to the boundary between the first data period and the second data period when the one or more additional transitions occur after the edge has been generated.

12. The apparatus of claim 11, wherein the first data period occurs before the second data period, and wherein the edge is used to capture a delayed version of data transmitted in the first data period.

13. The apparatus of claim 9, wherein the first-occurring transition occurs on one of the plurality of data lanes.

14. The apparatus of claim 9, wherein the first-occurring transition occurs in the double data rate clock signal.

15. A clock recovery circuit, comprising:
a plurality of latches configured to store a first signaling state of a plurality of lanes of a data communication link, the plurality of lanes including a timing lane and at least one data lane;
a comparator configured to compare the first signaling state with a second signaling state representing a current signaling state of the plurality of lanes of the data communication link; and
a pulse generation circuit adapted to provide a pulse responsive to a change in output of the comparator corresponding to a first-occurring transition in a double data rate clock signal carried on the timing lane or in a data signal carried in the at least one data lane, wherein each transition of the double data rate clock signal is aligned with a boundary between two data periods of the data signal; and
a clock generation circuit that generates a sampling clock from pulses provided by the pulse generation circuit, the sampling clock being configured to capture data from the at least one data lane,
wherein the plurality of latches replaces the first signaling state with the second signaling state after termination of the pulse.

16. The clock recovery circuit of claim 15, wherein the sampling clock is provided to a deserializer adapted to deserialize a data signal received from one or more lanes of the data communication link.

17. The clock recovery circuit of claim 15, wherein the pulse generation circuit is configured to ignore one or more additional changes in output of the comparator for the duration of the pulse.

18. The clock recovery circuit of claim 17, wherein the first-occurring transition occurs at a boundary between a first data period and a second data period that immediately follows the first data period, and wherein the one or more additional changes in output of the comparator correspond to transitions on the data communication link related to the boundary between the first data period and the second data period.

19. The clock recovery circuit of claim 15, wherein the first-occurring transition occurs at a boundary between a first data period and a second data period that immediately follows the first data period, and wherein the pulse is used to capture a delayed version of data transmitted in the first data period.

20. The clock recovery circuit of claim 15, further comprising:
  a plurality of differential receivers configured to provide the second signaling state,
  wherein each differential receiver is coupled to one of the plurality of lanes.

21. A clock recovery method, comprising:
  storing a first signaling state of a plurality of lanes of a data communication link as a previous signaling state, the plurality of lanes including a timing lane and at least one data lane;
  detecting a first-occurring transition in a double data rate clock signal carried on the timing lane or in a data signal carried in the at least one data lane by comparing the previous signaling state with a second signaling state representing a current signaling state of the plurality of lanes of the data communication link, wherein each transition of the double data rate clock signal is aligned with a boundary between two data periods of the data signal; and
  generating a pulse when the first-occurring transition is detected;
  using the pulse to generate a sampling clock configured to capture data from the at least one data lane; and
  storing the second signaling state as the previous signaling state after termination of the pulse.

22. The clock recovery method of claim 21, further comprising:
  using the sampling clock to deserialize a data signal received from one or more lanes of the data communication link.

23. The clock recovery method of claim 21, further comprising:
  ignoring one or more additional transitions in the plurality of lanes for the duration of the pulse.

24. The clock recovery method of claim 23, wherein the first-occurring transition and the one or more additional transitions occur at a boundary between a first data period and a second data period that immediately follows the first data period.

25. The clock recovery method of claim 21, further comprising:
  capturing a delayed version of data transmitted in a first data period, wherein the first-occurring transition occurs at a boundary between the first data period and a second data period that immediately follows the first data period.

26. The clock recovery method of claim 21, wherein the second signaling state is provided by a plurality of differential receivers, and wherein each differential receiver is coupled to one of the plurality of lanes.

* * * * *